United States Patent
Ismael et al.

(10) Patent No.: US 11,442,770 B2
(45) Date of Patent: Sep. 13, 2022

(54) FORMALLY VERIFIED TRUSTED COMPUTING BASE WITH ACTIVE SECURITY AND POLICY ENFORCEMENT

(71) Applicant: BedRock Systems, Inc., San Mateo, CA (US)

(72) Inventors: Osman Abdoul Ismael, Annapolis, MD (US); Ashar Aziz, Coral Gables, FL (US); Jonas Pfoh, Dresden (DE)

(73) Assignee: BedRock Systems, Inc., San Mateo, CA (US)

( * ) Notice: Subject to any disclaimer, the term of this patent is extended or adjusted under 35 U.S.C. 154(b) by 0 days.

(21) Appl. No.: 17/500,728

(22) Filed: Oct. 13, 2021

(65) Prior Publication Data

US 2022/0114009 A1    Apr. 14, 2022

Related U.S. Application Data

(60) Provisional application No. 63/091,294, filed on Oct. 13, 2020.

(51) Int. Cl.
  *G06F 9/455*    (2018.01)
  *G06F 9/50*    (2006.01)
  *G06F 9/54*    (2006.01)

(52) U.S. Cl.
  CPC ...... *G06F 9/45558* (2013.01); *G06F 9/45545* (2013.01); *G06F 9/5077* (2013.01); *G06F 9/545* (2013.01); *G06F 2009/4557* (2013.01); *G06F 2009/45587* (2013.01); *G06F 2009/45595* (2013.01)

(58) Field of Classification Search
  CPC .................................................. G06F 9/45558
  USPC .............................................................. 718/1
  See application file for complete search history.

(56) References Cited

U.S. PATENT DOCUMENTS

| | | |
|---|---|---|
| 8,584,239 B2 | 11/2013 | Aziz et al. |
| 8,793,787 B2 | 7/2014 | Ismael et al. |
| 9,009,822 B1 | 4/2015 | Ismael et al. |
| 9,009,823 B1 | 4/2015 | Ismael et al. |
| 9,159,035 B1 | 10/2015 | Ismael et al. |

(Continued)

OTHER PUBLICATIONS

Garfinkel T, Rosenblum M (2003) A virtual machine introspection based architecture for intrusion detection. In: Proceedings of the network and distributed systems security symposium, Feb. 2003 (Year: 2003).*

(Continued)

*Primary Examiner* — Mehran Kamran

(74) *Attorney, Agent, or Firm* — Nicholson De Vos Webster & Elliott LLP

(57) ABSTRACT

A formally verified trusted computing base with active security and policy enforcement is described. The formally verified trusted computing base includes a formally verified microkernel and multiple formally verified hyper-processes including a virtual machine monitor (VMM), virtual machine introspection (VMI), policy enforcers including an active security policy enforcer (ASPE), and a virtual switch. The active security and policy enforcement continuously monitors for semantic behavior detection or policy violations and enforces the policies at the virtualization layer. Further, policies can be attached to the network layer to provide granular control of the communication of the computing device.

16 Claims, 13 Drawing Sheets

(56) References Cited

U.S. PATENT DOCUMENTS

| | | | |
|---|---|---|---|
| 9,176,843 | B1 | 11/2015 | Ismael et al. |
| 9,195,829 | B1 | 11/2015 | Goradia et al. |
| 9,355,247 | B1 | 5/2016 | Thioux et al. |
| 9,367,681 | B1 | 6/2016 | Ismael et al. |
| 9,680,862 | B2 | 6/2017 | Ismael et al. |
| 9,824,209 | B1 | 11/2017 | Ismael et al. |
| 9,846,588 | B2 * | 12/2017 | Ghosh ................... G06F 21/53 |
| 9,912,681 | B1 | 3/2018 | Ismael et al. |
| 9,921,978 | B1 | 3/2018 | Chan et al. |
| 9,934,376 | B1 | 4/2018 | Ismael |
| 10,002,252 | B2 | 6/2018 | Ismael et al. |
| 10,025,691 | B1 | 7/2018 | Ismael et al. |
| 10,089,461 | B1 | 10/2018 | Ha et al. |
| 10,191,861 | B1 | 1/2019 | Steinberg et al. |
| 10,462,173 | B1 | 10/2019 | Aziz et al. |
| 10,474,813 | B1 | 11/2019 | Ismael |
| 10,592,678 | B1 | 3/2020 | Ismael et al. |
| 10,826,933 | B1 | 11/2020 | Ismael et al. |
| 10,893,059 | B1 | 1/2021 | Aziz et al. |
| 2013/0174147 | A1 * | 7/2013 | Sahita ................. G06F 9/45558 718/1 |
| 2014/0137180 | A1 * | 5/2014 | Lukacs ................... G06F 21/53 726/1 |
| 2014/0337836 | A1 | 11/2014 | Ismael |
| 2015/0013008 | A1 * | 1/2015 | Lukacs ................ G06F 21/566 726/24 |
| 2015/0096025 | A1 | 4/2015 | Ismael |
| 2015/0121135 | A1 | 4/2015 | Pape |
| 2015/0127830 | A1 | 5/2015 | Brown et al. |
| 2015/0163158 | A1 * | 6/2015 | Ryland ................ H04L 41/0893 709/225 |
| 2015/0186643 | A1 * | 7/2015 | Tu .......................... G06F 21/54 726/23 |
| 2015/0186645 | A1 | 7/2015 | Aziz et al. |
| 2015/0199532 | A1 | 7/2015 | Ismael et al. |
| 2016/0006756 | A1 * | 1/2016 | Ismael ................... G06F 21/57 726/22 |
| 2016/0285830 | A1 * | 9/2016 | Dong .................. G06F 9/45558 |
| 2016/0314297 | A1 * | 10/2016 | Tu ....................... G06F 9/45558 |
| 2016/0373481 | A1 * | 12/2016 | Sultan .................. G06F 21/554 |
| 2017/0147819 | A1 * | 5/2017 | Vasilenko ............ G06F 21/554 |
| 2017/0149804 | A1 * | 5/2017 | Kolbitsch ............ H04L 63/1416 |
| 2017/0180325 | A1 * | 6/2017 | Palermo .............. H04L 41/0893 |
| 2017/0289109 | A1 * | 10/2017 | Caragea .............. G06F 12/1009 |
| 2018/0173555 | A1 * | 6/2018 | Lutas ...................... G06F 9/542 |
| 2018/0227317 | A1 * | 8/2018 | Xu ...................... H04L 63/1466 |
| 2019/0012465 | A1 * | 1/2019 | Kim ..................... G06F 21/552 |
| 2019/0095350 | A1 * | 3/2019 | Durham ................. G06F 21/53 |
| 2019/0129741 | A1 * | 5/2019 | Dabak .................. G06F 21/629 |
| 2019/0370049 | A1 * | 12/2019 | Gopalan .............. G06F 9/45558 |
| 2020/0019695 | A1 * | 1/2020 | Sovio ..................... G06F 21/74 |
| 2020/0394064 | A1 * | 12/2020 | Urias ...................... G06F 12/08 |
| 2021/0294628 | A1 * | 9/2021 | Tsirkin .................. G06F 21/78 |

OTHER PUBLICATIONS

Butler, Kevin Raymond Boyce, "Leveraging Emerging Storage Functionality for New Security Services." In: A Dissertation in Computer Science and Engineering, Aug. 2010, 207 pages.

International Search Report and Written Opinion, PCT App. No. PCT/US2021/054815, dated Feb. 1, 2022, 8 pages.

* cited by examiner

FORMALLY VERIFIED TRUSTED COMPUTING BASE WITH ACTIVE SECURITY AND POLICY ENFORCEMENT

CROSS-REFERENCE TO RELATED APPLICATIONS

This application claims the benefit of U.S. Provisional Application No. 63/091,294, filed Oct. 13, 2020, which is hereby incorporated by reference

FIELD

Embodiments of the invention relate to the field of virtualization; and more specifically, to a formally verified trusted computing base with active security and policy enforcement.

BACKGROUND

Virtualization makes it possible for multiple operating systems (OSs) to run concurrently on a single host system without those OSs needing to be aware of the others. The single physical host machine is multiplexed into virtual machines (VMs) on top of which unmodified OSs (referred to as guest OSs) can run. Conventional implementations include a software abstraction layer between the hardware (which may support full virtualization) and the hosted operating system(s). The virtualization layer translates between virtual devices and the physical devices of the platform. In a fully virtualized environment, a guest operating system (OS) can run a virtual machine without any modifications and is typically unaware that it is being virtualized. Paravirtualization is a technique that makes a guest OS aware of its virtualization environment and requires hooks to a guest OS which requires access to its source code, or a binary translation be performed.

Although virtualization relies on hardware support, a software component called a microkernel runs directly on the hardware of the host machine and exposes the VM to the guest OS. The microkernel is typically the most privileged component of the virtual environment. The microkernel abstracts from the underlying hardware platform and isolates components running on top of it. A virtual machine monitor (VMM) manages the interactions between virtual machines and the physical resources of the host system. The VMM exposes an interface that resembles physical hardware to its virtual machine, thereby giving the guest OS the illusion of running on a bare-metal platform. As compared to the microkernel, the VMM is a deprivileged user component whereas the microkernel is a privileged kernel component.

Virtual Machine Introspection (VMI) is a technique conventionally used to observe hardware states and events and can be used to extrapolate the software state of the host. VMI leverages the property of a VMM that has access to all the state of a virtual machine including the CPU state, memory, and I/O device state.

SUMMARY

A formally verified trusted computing base with active security and policy enforcement is described. The formally verified trusted computing base includes a formally verified microkernel and multiple formally verified hyper-processes including a virtual machine monitor (VMM), virtual machine introspection (VMI), policy enforcers including an active security policy enforcer (ASPE), and a virtual switch. The active security and policy enforcement continuously monitors for semantic behavior detection or policy violations and enforces the policies at the virtualization layer. Further, policies can be attached to the network layer to provide granular control of the communication of the computing device.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
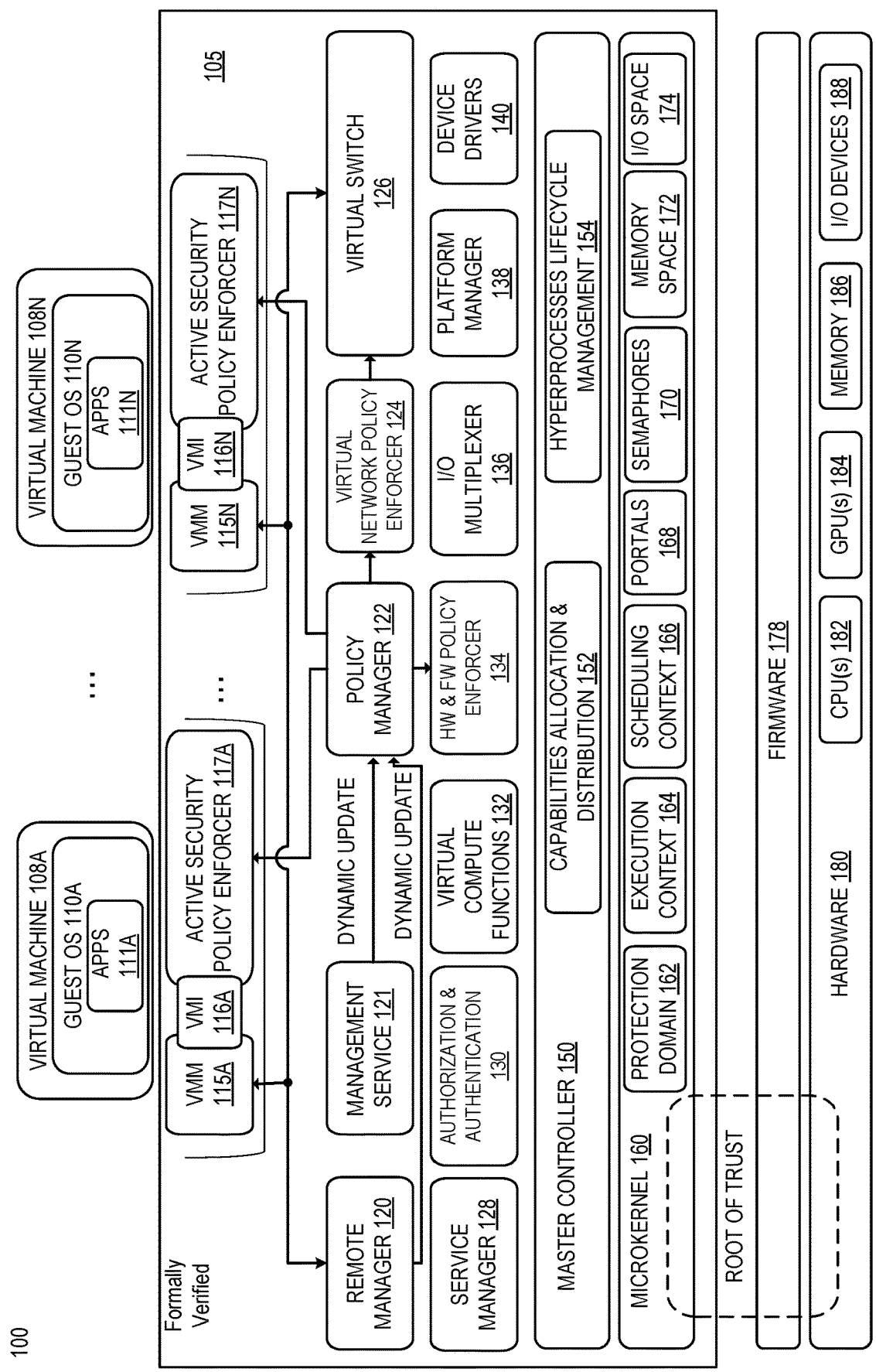
FIG. 1 is a block diagram that illustrates an exemplary architecture for a formally verified trusted computing base with active security and policy enforcement, according to an embodiment.

A formally verified trusted computing base with active security and policy enforcement is described. The formally verified trusted computing base includes a formally verified microkernel and multiple formally verified hyper-processes including a virtual machine monitor (VMM), virtual machine introspection (VMI), policy enforcers including an active security policy enforcer (ASPE), and a virtual switch. The virtualized system can run unmodified guest operating systems without recompiling the kernel or any application. The fundamental hardware abstraction layer can leverage hardware features while concealing them from the unmodified guest operating system, thereby increasing system security.

In an embodiment, there is a one-to-one mapping from a guest operating system or application to a VMM, VMI, and ASPE construct. This provides for better isolation properties (e.g., process and memory segregation) as compared to conventional virtualized systems that have a many-to-one mapping from guest operating systems to a VMM/VMI construct. This separation helps protect against microarchitecture-based side channel attacks. Further, this separation provides assurance in a multi-tenant environment that essential forensic data and telemetries are not leaked between the guest operating systems.

The formally verified trusted computing base isolates assets, and monitors and enforces policy on all resources, APIs, and communication. The virtualized system controls the basic primitives of compute for the physical computing device: control flow, memory, and time. The virtualized system has visibility to everything the virtual machine does without having to change the guest operating system or the guest application, and without having to deploy any software within the guest operating system or guest application. Thus, the virtualized system is isolated from the attack surface of the guest VM.

In an embodiment, the formally verified microkernel implements a capability-based system that ensures that resources can be accessed only when explicitly enabled. In such an embodiment, each piece of executing code and resource requires explicit authorization in the form of a granted capability to access a hardware resource or code resource.

The virtualized system performs active security and policy enforcement. In an embodiment, the active security policy enforcement continuously monitors for semantic behavior detection or policy violations and enforces the policies at the virtualization layer. Thus, the active security and policy enforcement protects and enforces the behavior of the guest operating systems or guest applications, even within a contested environment. The active security policy enforcement includes performing introspection on hardware resources (e.g., CPUs, GPUs, memory, I/O devices such as USB, disk storage, network devices, etc.), monitoring application and OS behavior, and/or monitoring code and data integrity. VMI is used for creating detailed forensics for gesture machines, virtual services, and hardware resources. In combination with deep semantic information about the guest operating systems or guest applications, fine-grained policies can be enforced, which can block malicious behavior from instruction level to application behavior, for example.

The policies may be different for different guest operating systems or applications. For instance, a policy for a first guest operating system may allow network communication whereas a policy for a second guest operating system may not allow network communication. Policies may be configured locally on the system or may be received remotely and dynamically. For instance, if it is determined that there is a domain that is serving malware, a remote server can transmit a policy to the virtualized system that prevents access to that particular domain. Thus, as an example, the network policies and enforcement at a virtual switch of the virtualized system allow for granular control of the communication of the computing device.

FIG. 1 is a block diagram that illustrates an exemplary architecture for a formally verified trusted computing base with active security and policy enforcement, according to an embodiment. The computing device 100 may be any type of computing device such as a desktop computer, a laptop computer, a server computer, a mobile device such as a smartphone or tablet, a wearable device, a set-top box, a medical computing device, a gaming device, an internet-of-things (IoT) device, or any other computing device that can implement a virtualized system. The computing device 100 executes a hypervisor 105.

The virtualized system includes one or more guest operating systems 110A-N and guest applications 111A-N respectively running on top of one or more virtual machines 108A-N respectively. The guest OS and applications may be unmodified. In an embodiment, each virtual machine has a separate virtual machine monitor (VMM) with virtual machine introspection (VMI) and separate active security policies, which ensures maximum process and memory segregation. Thus, the VMM 115A, VMI 116A, and the active security policy enforcer 117A are dedicated for the guest operating system 110A and guest applications 111A running on the virtual machine 108A; and the VMM 115N, VMI 116N, and the active security policy enforcer 117N are dedicated for the guest OS 110N and guest applications 111N running on the virtual machine 108N. This separation provides a level of protection even against bugs in the hardware as the memory of each VM is mapped into a specific isolated memory space and no memory from other VMMs and their VMs can be read.

Each VMM runs as a user-level application in an address space on top of the microkernel 160 and supports the execution of the guest OS (e.g., an unmodified guest OS) running in a virtual machine. Each VMM emulates sensitive instructions and provides virtual devices. Each VMM manages the guest-physical memory of its associated virtual machine by mapping a subset of its own address space into the host address space of the VM. Each VMM can translate the guest virtual addresses to guest physical addresses. Each VMM can configure/modify access permissions of individual guest physical addresses in the system's second level address translation tables (slats). Each VMM can also map any of its I/O ports and memory-mapped I/O (MMIO) regions into the virtual machine to grant direct access to a hardware device. For example, a VMM creates a dedicated portal for each event type and sets the transfer descriptor in the portals such that the microkernel 160 transmits only the architectural state required for handling the particular event. For example, the VMM configures the portal corresponding to the CPUID instruction with a transfer descriptor that includes only the general-purpose registers, instruction pointer, and instruction length.

When a VM-exit event occurs, the microkernel 160 sends a message to the portal corresponding to the VM-exit event and transfers the requested architectural state of the virtual CPU to the handler execution context in the VMM. The VMM determines the type of virtualization event from the portal that was called and then executes the correct handler function. To emulate instructions such as CPUID, the VMM loads the general-purpose registers with new values and advances the instruction pointer to point behind the instruction that caused the VM exit. The VMM transmits the updated state to the microkernel 160 and the virtual CPU can resume execution.

Each VMM provides one or more virtual devices for its guest OS. Each virtual device is modeled as a software state machine that mimics the behavior of the corresponding hardware device. When an instruction reads from or writes to an I/O port or memory-mapped I/O register, the VMM updates the state machine of the corresponding device model in a like way as the physical hardware device would update its internal state. When a guest OS wants to perform an operation such as a disk read, the VMM contacts the device driver for the host device to deliver the data.

If a virtual CPU performs a memory-mapped I/O access, a VM-exit event occurs. The microkernel 160 sends a fault message to the corresponding VMM because the region of guest-physical memory corresponding to the disk controller is not mapped in the host address space of the virtual machine. The VMM decodes the instruction and determines that the instruction accesses the virtual disk controller. By executing the instruction, the VMM updates the state machine of the disk model. After the guest operating system has programmed the command register of the virtual disk controller to read a block, the VMM sends a message to the disk server to request the data. The device driver in the disk server programs the physical disk controller with a command to read the block into memory. The disk driver requests a direct memory access (DMA) transfer of the data directly into the memory of the virtual machine. It then returns control back to the VMM, which resumes the virtual machine. Once the block has been read from disk, the disk controller generates an interrupt to signal completion. The disk server writes completion records for all finished requests into a region of memory shared with the VMM. Once the VMM has received a notification message that disk operations have completed, it updates the state machine of the device model to reflect the completion and signals an interrupt at the virtual interrupt controller. During the next VM exit, the VMM injects the pending interrupt into the virtual machine.

A particular VMM has full visibility into the entire guest state of its corresponding virtual machine including hardware state (e.g., CPU state (e.g., registers), GPU state (e.g., registers), memory, I/O device state such as the contents of storage devices (e.g., hard disks), network card state, register state of I/O controllers, etc.), application and OS behavior, and code and data integrity. Virtual Machine Introspection (VMI) is performed to inspect the guest and has visibility of every system call, resource access, and application/process launch and termination. For example, the VMM can program the hardware to trap certain events which can be used by the VMI to take and inspect the guest's state at that moment. Thus, the VMM can inspect all interactions between the guest software and the underlying hardware.

The microkernel 160 of the hypervisor 105 may be a lightweight microkernel running at the most privileged level as required by its role to abstract hardware resources (e.g., the CPU) with a minimum interface, and may have less than 10 kloc of code. The hardware 180 of the computing device 100 includes one or more central processing units (CPUs) 182, one or more graphics processing units (GPUs) 184, one or more memory units 186 (e.g., volatile memory such as SRAM or DRAM), and one or more input/output devices 188 such as one or more non-volatile storage devices, one or more human interface devices, etc. The hardware components are exemplary and there may be fewer pieces and/or different pieces of hardware included in the system. For instance, the hardware 180 may not include a GPU. Sitting atop the hardware 180 is the firmware 178. The firmware 178 may include CPU microcode, platform BIOS, etc.

The microkernel 160 drives the interrupt controllers of the computing device 100 and a scheduling timer. The microkernel 160 also controls the memory-management unit (MMU) and input-output memory-management unit (IOMMU) if available on the computing device 100. The microkernel 160 implements a capability-based interface. In an embodiment, the microkernel 160 is organized around several kernel objects including the protection domain 162, execution context 164, scheduling context 166, portals 168, and semaphores 170. For each new kernel object, the microkernel 160 installs a capability that refers to that object in the capability space of the creator protection domain 162. A capability is opaque and immutable to the user, and they cannot be inspected, modified, or addressed directly. Applications access a capability through a capability selector which may be an integral number that serves as an index into the protection domain's capability space. The use of capabilities leads to fine-grained access control and supports the design principle of least privilege among all components. In an embodiment, the interface to the microkernel 160 uses capabilities for all operations which means that each protection domain 162 can only access kernel objects for which it holds the corresponding capabilities.

The protection domain 162 kernel object implements spatial isolation. The protection domain 162 acts as a resource container and abstracts the differences between a user application and a virtual machine. Each protection domain 162 may include three spaces: the memory space 172 that manages the page table, the I/O space 174 that manages the I/O permission bitmap, and a capability space that controls access to kernel objects.

The execution context 164 represents the activities in a protection domain. Execution contexts 164 abstract from the differences between threads and virtual CPUs and/or GPUs. Each execution context 164 can execute program code, manipulate data, and use portals to send messages to other execution contexts 164. Each execution context 164 has its own CPU/FPU register state and/or GPU register state.

The scheduling context 166 is used by the microkernel 160 to enforce temporal separation. Scheduling contexts 166 couple a time quantum with a priority and ensure that no execution context 164 can monopolize the CPU. The priority of a scheduling context 166 reflects its importance. The time quantum facilitates round-robin scheduling among scheduling contexts 166 with equal importance.

The portals 168 govern communication between protection domains 162. Each portal 168 represents a dedicated entry point into the protection domain 162 in which the portal 168 was created. The creator can subsequently grant other protection domains 162 access to the portal 168 to establish a cross-domain communication channel.

The semaphores 170 enable synchronization between execution contexts 164 on the same or on different processors or cores by selectively blocking and unblocking execution contexts 164. The microkernel 160 uses the semaphores 170 to signal the occurrence of hardware interrupts to user applications. Access to a semaphore is controlled by a semaphore object capability.

Running on top of the microkernel 160 are multiple hyper-processes. Each hyper-process runs as a separate protected and microkernel 160 enforced memory and process space, outside of the privilege level of the microkernel 160. In an embodiment, each hyper-process is formally verified. Some of these hyper-processes communicate with the microkernel 160 such as the master controller 150. The master controller 150 controls the operation of the virtualization such as memory allocation, execution time allotment, virtual machine creation, and/or inter-process communication. For instance, the master controller 150 controls the capabilities allocation and distribution 152 and the hyper-processes lifecycle management 154 that manages the lifecycle of hyper-processes.

A capability is a reference to a resource, plus associated auxiliary data such as access permissions. A null capability does not refer to anything and carries no permissions. An object capability is stored in the object space of a protection domain and refers to a kernel object. A protection domain object capability refers to a protection domain. An execution context object capability refers to an execution context. A scheduling context object capability refers to a scheduling context. A portal object capability refers to a portal. A semaphore object capability refers to a semaphore. A memory object capability is stored in the memory space of a protection domain. An I/O object capability is stored in the I/O port space of a protection domain and refers to an I/O port.

The remote manager 120 is a single point of contact for external network communication for the computing device 100. The remote manager 120 defines the network identity of the computing device 100 by implementing the TCP/IP stack and may also implement the TLS service for cryptographic protocols designed to provide secure communications over the network. In an embodiment, the remote manager 120 validates the network communication (an attestation of both endpoints).

The virtual switch 126 implements a virtual switch element. The virtual switch 126 emulates a physical network element and allows for external network communication for guest operating systems or guest applications depending on the network configuration. The virtual switch 126 may also allow network communication between guest operating systems or guest applications depending on the configuration of the virtual switch 126. Although the term "switch" has been used, in some embodiments the virtual switch 126 can see through L7 of the OSI model. As will be described in greater detail later herein, virtual network policies may be applied to the virtual switch 126.

The service manager 128 allows hyper-processes to register an interface (functions that they implement) associated with a universally unique identifier (UUID). For example, the device drivers 140 may register a serial driver with the service manager 128 to provide a universal asynchronous receiver-transmitter (UART) service with its UUID. The I/O multiplexer 136 (e.g., a UART multiplexer) can request the service manager 128 access to that service to use the serial port.

The authorization and authentication hyper-process 130 defines user credentials with their associated role for access control to all the exported functions of the virtualized system.

The management service 121 exposes the management functions to the outside world. The management service 121 exposes an application programming interface (API) that can be consumed by third party device managers. The exposed functions may include inventory, monitoring, and telemetry, for example. The management service 121 may also be used for configuring policies.

The virtual compute functions 132 implement the lifecycle of the VM including creating a VM, destroying a VM, starting a VM, stopping a VM, freezing a VM, creating a snapshot of the VM, and/or migrating the VM. The I/O multiplexer 136 is used to multiplex I/O device resources to multiple guests. As described above, the I/O multiplexer 136 can request the service manager 128 for access to a registered interface to use the particular I/O device.

The platform manager 138 provides access to the shared and specific hardware resources of a device, such as clocks that are used by multiple drivers, or power. A hyper-process cannot directly shutdown or slow down a CPU core since it may be shared by other hyper-processes. Instead, the platform manager 138 is the single point of decision for those requests. Thus, if a hyper-process wants to shut down or slow down a CPU core, for instance, that hyper-process would send a request to the platform manager 138 which would then make a decision on the request.

The device drivers 140 control access to the drivers of the computing device 100. The device drivers may include a driver for a storage device, network adapter, sound card, printer (if installed), video card, USB device(s), UART devices, etc.

Active security with policy enforcement may be performed by the virtualized system according to an embodiment. The active security and policy enforcement is performed in coordination with the policy manager 122 and one or more policy enforcers such as the active security policy enforcers 117A-117N (using the VMI 116A-116N respectively), the virtual network policy enforcer 124, and the hardware and firmware policy enforcer 134. In an embodiment, the policies that can be enforced includes active security policies, virtual network policies, and/or hardware and/or firmware policies. The policies may be formally verified.

An active security policy enforces the behavior of a guest OS or guest application. Example active security policies include: process allowance, process denial, driver allowance, driver denial, directory allowance, directory denial, file type allowance, file type denial, I/O device allowance, I/O device denial, limiting the number of writes to a particular register and/or limiting the values that can be in a particular register, and protecting a memory page (e.g., limiting writes or reads to specific memory pages, ensuring the memory is not executed).

A virtual network policy enforces the behavior of the network of the computing device 100 (e.g., affects transmitting data outside of the computing device 100 and/or receiving data into the computing device 100). Example virtual network policies include: source/destination MAC address allow/deny lists, source/destination IP address allow/deny lists; domain allow/deny lists, port allow/deny lists, protocol allow/deny lists, physical layer allow/deny lists (e.g., if a network adapter is available for a particular process or guest application), L4-L7 policies (e.g., traffic must be encrypted; traffic must be encrypted according to a certain cryptographic protocol, etc.), and documents subject to a data loss prevention (DLP) policy. These are example policies and other policies may be created that affect transmitting data outside of the computing device 100 and/or receiving external data into the computing device 100.

Hardware or firmware policies enforce configurations of host hardware configurations/functions and/or host firmware configuration. For instance, a policy may be enforced to require a particular BIOS configuration.

Enforcement of some of the policies may use VMI. A VMI hyper-process is used to inspect the corresponding guest from the outside of the guest. The VMI hyper-process has access to the state of the guest including the CPU(s) 182, GPU(s) 184, memory 186, and I/O devices 188 in which the guest is using. A VMI hyper-process may include a semantic layer to bridge the semantic gap including reconstructing the information that the guest operating system has outside of the guest within the VMI hyper-process. For instance, the semantic layer identifies the guest operating system and makes the location of its symbols and functions available to the VMI hyper-process. In some embodiments, the VMI hyper-process monitors the system calls of the guest. A system call facilitates communication between the kernel and user space within an OS. The VMI hyper-process may request the corresponding VMM to trap one or more system calls to the VMI hyper-process.

The policy manager 122 manages policies for the virtualized system as will be described in greater detail below. As an example, a policy may dictate which drivers may be loaded in the guest kernel; or a policy may dictate which guests can be in the same virtual local area network (VLAN). The policies may include active security policies, virtual network policies, and/or hardware and/or firmware policies. The policies may be different for different guest operating systems or applications. For instance, a policy for a first guest operating system may allow network communication whereas a policy for a second guest operating system may not allow network communication.

The policies may be configured locally using the management service 121 and/or remotely using the remote manager 120 or may be configured locally on the computing device 100. For instance, if it is determined that there is a domain that is serving malware, a remote server can transmit a policy to the remote manager 120 that specifies that access to that particular domain should be prevented. The remote manager 120 then sends the policies to the policy manager 122. The policy manager 122 installs the policies to one or more policy enforcement points that are referred to as policy enforcers. Example policy enforcers include the active security policy enforcers 117A-117N, the virtual network policy enforcer 124, and the hardware and firmware policy enforcer 134. The policies may be received and installed dynamically.

The policies may have a user component and/or a time component. For instance, a virtual network policy may specify that a particular domain cannot be reached at a certain time of the day (e.g., overnight). As another example, a virtual network policy may specify that a particular application is allowed network connectivity at only certain times during the day. As another example, a virtual network policy may specify the domains in which a particular user of the guest operating system can access or cannot access, which may be different from another virtual network policy for another user of the guest operating system. As another example, a hardware policy may specify that a particular file or directory cannot be accessed by a guest operating system or application (or potentially a process) during a specific time.

The virtual network policy enforcer 124 enforces virtual network policies for the network of the computing device 100. The virtual network policies are attached to the virtual switch 126. The virtual network policies and their enforcement at the virtual switch 126 allow for granular control of the communication of the computing device 100 including communication between guest operating systems or guest applications of the virtualized layer and/or external communication from the computing device 100 and/or external communication into the computing device 100. In an embodiment, any or all communication destined for a device external to the computing device 100 and/or all communication received from a device external to the computing device 100 can be subject to a virtual network policy.

A virtual network policy may be configured to be specific to a particular process or application. For instance, a virtual network policy may be configured so that a web browser process may only be allowed access to specific ports and/or specific IP addresses or domains.

The virtual network policies may have a user component and/or a time component. For instance, a virtual network policy may specify that a particular domain cannot be reached at a certain time of the day (e.g., overnight). As another example, a virtual network policy may specify that a particular application is allowed network connectivity at only certain times during the day. As another example, a virtual network policy may specify the domains in which a particular user of the guest operating system can access or cannot access, which may be different from another virtual network policy for another user of the guest operating system.

The policy manager 122 may also configure the virtual switch 126 through the virtual network policy enforcer 124. For instance, the policy manager 122 may send a network configuration to the virtual network policy enforcer 124 for configuring virtual Ethernet devices and assigning them to particular VMs, configuring virtual LANs and assigning particular virtual Ethernet devices, etc. The virtual network policy enforcer 124 in turn configures the virtual switch 126 accordingly.

The policies may include hardware and/or firmware policies for enforcing configuration of host hardware configurations/functions and host firmware configuration and function. The hardware and/or firmware policies may be enforced by the hardware and firmware policy enforcer 134. A hardware policy may affect one or more of the CPU(s) 182, GPU(s) 184, memory 186, and/or one or more I/O devices 188. As an example, a policy may be enforced to require a particular BIOS configuration.

The preceding example policies are exemplary and not exhaustive. Other types of policies may be implemented by the virtualization layer.

The policy manager 122 manages active security policies for the virtualized system as described herein. In an embodiment, the policy manager 122 is event driven. For instance, the policy manager 122 enforces policy statements that indicate what action to take when a specified event occurs. The policy manager 122 may push event policies to policy enforcers such as the active security policy enforcers 117A-117N, the virtual network policy enforcer 124, and/or the hardware and firmware policy enforcer 134, that may result in the policy enforcers generating and transmitting events to the policy manager 122. As an example, the policy manager 122 may enforce a policy that defines if a certain event is received, the policy manager 122 is to isolate the isolating VM from the network. For instance, the policy manager 122 may instruct a particular VMI to enforce a process allow list and to generate a process event if the allow list is violated (a process not on the allow list is created) and transmit the event to the policy manager 122 (or the policy manager 122 could poll the policy enforcers for events). Upon receipt of such a process event, the policy manager 122 may issue an action request to the virtual network policy enforcer 124 to cause the virtual switch 126 to remove the VM from the network (e.g., prevent the VM from accessing the network).

In an embodiment, a policy for a policy enforcer takes the form of: <EVENT>, [<ARG[0]>, . . . ], do [<ACTION [0]>, . . . ]. The Event parameter defines the name of the event, the Argument list defines the arguments provided to the event producer, and the Action list defines one or more actions the policy enforcer takes if the event is produced. By way of example, a file allow list event policy may be defined to apply to a particular process (e.g., which may be identified by a directory that contains the executable file in question), allow that process to read files from a particular directory, and allow that process to read files with a particular file extension, and if that process attempts to read files from either a different directory or from that directory but with a different file extension, the policy enforcer may execute the one or more actions (such as sending an event to the policy manager 122, blocking the attempted read, etc.).

In an embodiment, a policy for the policy manager 122 takes the form of: on <EVENT> if <FILTER> do [<ACTION>, . . . ]. A filter, which is optional in some embodiments, allows for further conditions to be put on the event. A filter could be a function that always returns true if the condition(s) are satisfied. For instance, a filter could be defined that returns true only once an event has been received a certain number of times (e.g., five times) and potentially over a certain time period. This allows the policy manager 122 to make stateful decisions that may be shared across rules. The policy manager 122 may take one or more actions as defined in the action list of the policy. Each action may be defined by a tuple that takes the form of: (executor, action). The executor specifies which entity should carry out the specified action. The executor may be the policy manager 122 itself or a particular policy enforcer (e.g., active security policy enforcer, virtual network policy enforcer, hardware and firmware policy enforcer). The policy statements and actions in the access list are typically considered in order.

An action to be performed may be requested as an action request. An action request is an asynchronous request made by the policy manager 122. An action request includes the action requested and may include one or more parameters to specify how to execute the action. For example, a Kill Task action may include a process identifier (pid) parameter that specifies which task to terminate. Depending on the particular action, action requests can be sent to policy enforcers (e.g., ASPE, virtual network policy enforcer, hardware and firmware policy enforcer) or be carried out by the policy manager 122 itself. For instance, a log event action request may be performed by the policy manager 122 itself. Policy enforcers accept action requests and perform the requested actions. Performing an action may cause one or more additional actions to be performed. For instance, an active security policy enforcer may offer a Kill Task action, and the virtual network policy enforcer 124 may offer an update VLAN configuration action. An action request may result in the generation of new events, which can be sent to the policy manager 122. These can be sent asynchronously and the policy manager 122 may consider these for its own policy.

Some events may require the policy enforcer to wait for acknowledgement before proceeding. In such a case, the policy manager 122 responds to the event with an acknowledgement action for which the policy enforcer waits to receive before continuing.

In an embodiment, the policy manager 122 pushes a new or updated policy to a policy enforcer or revokes an existing policy installed at a policy enforcer by sending an update policy action to the policy enforcer. The update policy action includes the policy for the particular policy enforcer.

In some embodiments, communication between the policy manager 122 and policy enforcers uses a publish/subscribe model. For instance, events and action requests can be assigned a unique message ID and handlers can be registered in the policy manager 122 to handle incoming events and handlers can be registered in the policy enforcers to handle action requests.

Figure 2:
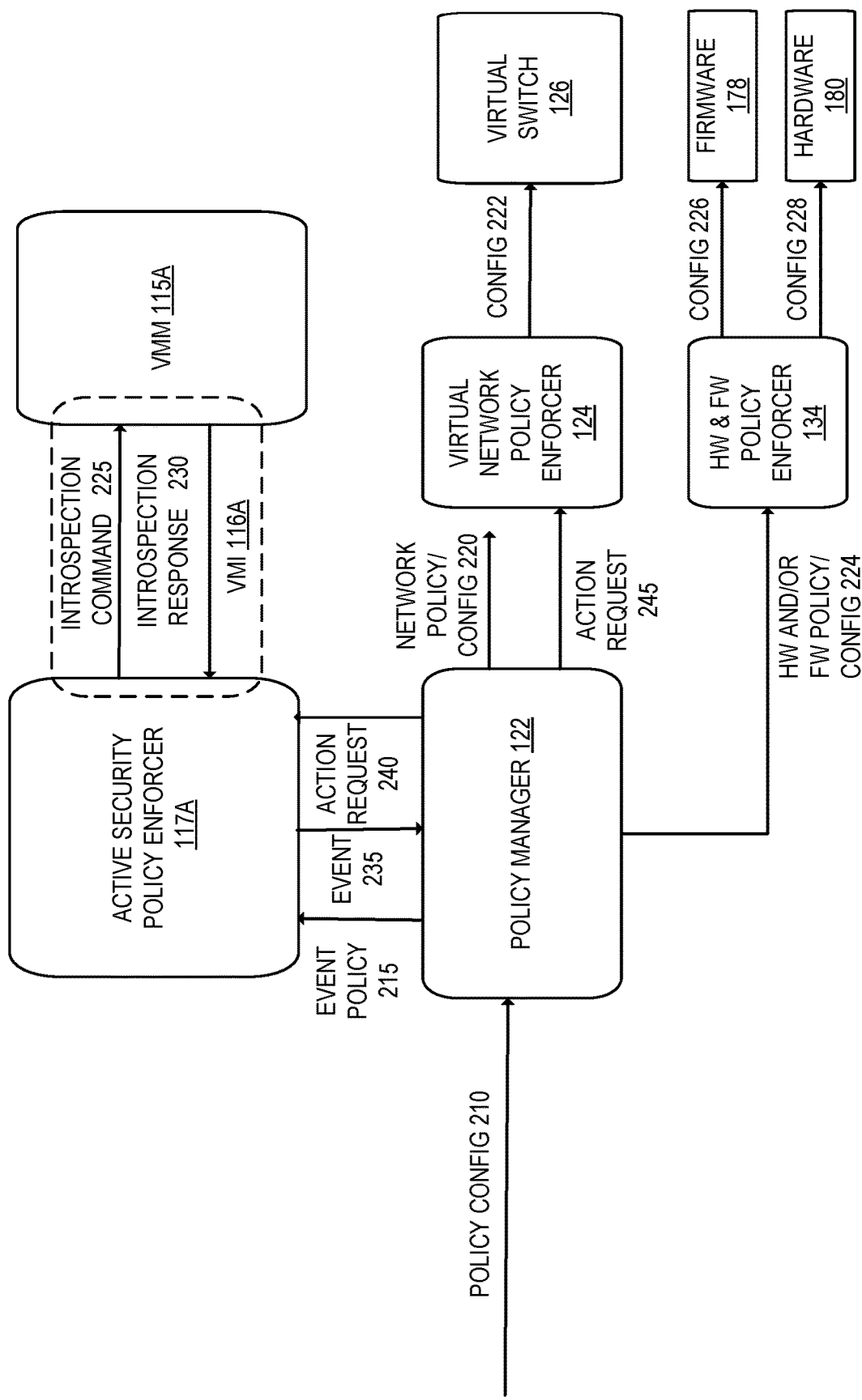
FIG. 2 is a block diagram that illustrates policy enforcement according to some embodiment.

FIG. 2 is a block diagram that illustrates policy enforcement according to some embodiment. The policy manager 122 receives policy configuration 210. The received policy configuration 210 can be received from local configuration (e.g., through an API, command line interface (CLI), etc.) or received remotely. The policy configuration 210 may be an active security policy, a virtual network policy, a hardware or firmware policy, or other policy that affects the operation of the virtualized system. The policy configuration 210 may be a policy that is applicable to each guest OS or guest application, or may be specific to one or more virtual machines, guest operating systems, guest applications, and/or guest processes. The policy configuration 210 may specify the virtual machine, guest operating system, guest application, and/or guest process for which the policy is applicable. The policy manager 122 determines where to install the policy in question.

In some embodiments, the policy manager 122 pushes a new or updated policy to the determined policy enforcer by sending an update policy action to that policy enforcer. The policy manager 122 can also revoke a policy associated with a specific policy enforcer by sending an update policy action to that policy enforcer. As represented in FIG. 2, the policy manager 122 pushes an event policy 215 to the active security policy enforcer 117A, pushes a network policy/configuration 220 to the virtual network policy enforcer 124, and pushes a hardware and/or firmware policy 224 to the hardware and firmware policy enforcer 134. These policies include the action requested (e.g., to install or update a policy) and may include one or more parameters to specify how to execute the action (e.g., what process for which the policy is applicable, what guest operating system or guest application for which the policy is applicable, etc.).

The policy enforcers receive and install the policies. For instance, after receiving the network policy/configuration 220 from the policy manager 122, the virtual network policy enforcer 124 installs the network configuration 222 to the virtual switch 126. The configuration may be for configuring VLANs, assigning virtual Ethernet devices, creating/updating allow/deny lists for source/destination ports, creating/updating allow/deny lists for source/destination IP addresses, creating/updating allow/deny lists for protocol(s), creating/updating allow/deny lists for certain port numbers, rate limiting from any port, and/or disconnecting any port.

In the case of the hardware and firmware policy enforcer 134, after receiving the hardware and/or firmware policy/configuration 224, the hardware and firmware policy enforcer 134 installs the firmware configuration 226 to the firmware 178 and installs the hardware configuration 228 to the hardware 180. An example firmware configuration may be used for updating or enabling a firmware secure boot configuration. By way of example, a hardware policy may cause a hardware device to be unavailable to a particular guest operating system or guest application.

In the case of the active security policy enforcer 117A, the installed policy may take the form of <EVENT>, [<ARG[0]>, . . . ], do [<ACTION[0]>, . . . ]. The active security policy enforcer 117A determines how to monitor the system to determine if the arguments of the event are met. For instance, if the active security policy includes determining whether a specific file was accessed by a particular process, the active security policy enforcer 117A may use the VMI 116A to introspect the kernel to determine if the specific file has been accessed. The active security policy enforcer 117A sends an introspection command 225 through the VMI 116A to the VMM 115A to introspect the guest. The VMM 115A in turn programs the hardware. For instance, the VMM 115A programs the hardware to trap certain events. The VMM 115A sends an introspection response 230 to the active security policy enforcer 117A through the VMI 116A. The introspection response 230 (sometimes referred to as a callback) may report that the event has occurred. The active security policy enforcer 117A receives the reporting of the event and determines whether the policy event received from the policy manager 122 has been met. If so, the active security policy enforcer 117A transmits the event message 235 to the policy manager 122.

Based on the event message, the policy manager 122 determines whether a policy has been violated and if so, what action(s) to take. The policy manager 122 may transmit action requests to policy enforcers, such as after an event has been detected in the system. For example, the action request 240 may be sent to the active security policy enforcer 117A, and the action request 245 may be sent to the virtual network policy enforcer 124. The action request is a synchronous request and includes the action requested and may include one or more parameters to specify how to execute the action. For example, a Kill Task action may include a process identifier (pid) parameter that specifies which task to terminate. Depending on the particular action, action requests can be sent to policy enforcers (e.g., ASPE, virtual network policy enforcer, hardware and firmware policy enforcer) or be carried out by the policy manager 122 itself. For instance, a log event action request may be performed by the policy manager 122 itself. Policy enforcers accept action requests and perform the requested actions.

Figure 3:
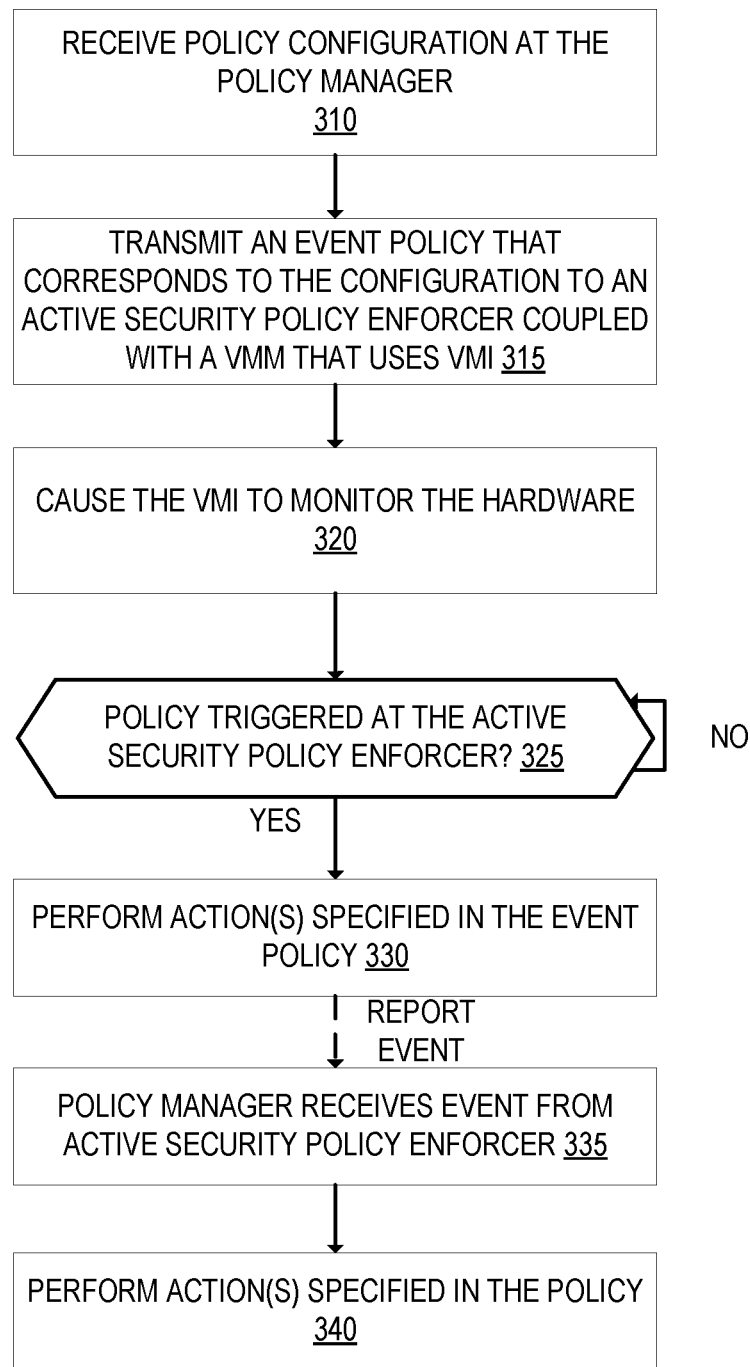
FIG. 3 is a flow diagram that illustrates exemplary operations for enforcing a policy according to an embodiment.

FIG. 3 is a flow diagram that illustrates exemplary operations for enforcing a policy according to an embodiment. The operations of FIG. 3 are described with the exemplary embodiment of FIG. 1. However, the operations of FIG. 3 can be performed by embodiments different from that of FIG. 1, and the embodiment of FIG. 1 can perform operations different from the operations of FIG. 3.

At operation 310, the policy manager 122 receives policy configuration for an active security policy. The received configuration may be received from a user or administrator of the computing device 100, and the received configuration may be received locally or remotely through the management service 121. The received configuration may also be received dynamically as part of an updated policy through the management service 121. The received policy configuration may specify which guest the policy is for. The received policy configuration may define the name of the event (if the arguments are satisfied), a set of one or more arguments that are used to determine whether the event occurs, and a set of one or more actions that are taken if the event occurs.

Next, at operation 315, the policy manager 122 transmits a policy corresponding to the configuration to an active security policy enforcer 117 coupled with a VMM 115 that uses VMI 116. As described above, if there are multiple active security policy enforcers, the policy configuration may specify which active security policy enforcer the policy is for. In some embodiments, the policy is transmitted as an action request to the active security policy enforcer 117.

The active security policy enforcer 117 that receives the policy installs the policy. At operation 320, the active security policy enforcer 117 causes the corresponding VMI 116 to monitor the hardware 180. For example, a policy may be enforced that says that a particular process cannot be run. The VMI 116 may cause the VMM 115 to set a breakpoint that is triggered when that particular process is attempted to be executed and to generate and send an event back to the VMI 116.

Next, at operation 325, the active security policy enforcer 117 determines whether the policy in question has been triggered (e.g., whether the policy has been violated). As described above, there may be multiple arguments that must be satisfied before the policy enforcement is triggered. If the policy enforcement is triggered, then at operation 330 the active security policy enforcer 117 performs the one or more actions specified in the event policy. If the action is to report the event, the reporting of the event is sent to the policy manager 122. Other actions may be to kill a process, stop an action, send an alert, etc.

If one of the actions is to report the event, then at operation 335, the policy manager 122 receives the reporting of the event from the active security policy enforcer 117. Next, at operation 340, the policy manager 122 performs one or more actions as specified in the policy. The one or more actions may include logging the violation of the policy, blocking the action, removing the offending process, guest operating system, and/or virtual machine from the network, killing the offending process, guest operating system, and/or virtual machine, etc.

As an exemplary policy, a register protection policy may be enforced by the virtualized system. The register protection policy may be created to protect CPU register(s) in one or more ways. For instance, a policy may be created that specifies the number of times a CPU register may be written. As another example, a policy may be created that specifies the value(s) a CPU register may have. As another example, a policy may be created that specifies (through the application of a bitmask) which bits of the CPU register the previous two policies should affect.

In an embodiment, upon the start of the policy manager 122 or after the policy configuration is received by the policy manager 122, the policy manager 122 pushes a policy to a particular one of the active security policy enforcers 117A-117N for which the policy is to apply. The decision on what guest operating system or application for which the policy is to apply may depend on the configuration of the computing device 100. The policy may specify the number of times a CPU register may be written, the values a CPU register may have, and/or which bits of the CPU register the previous two policies should affect. For the purposes of this example, the policy manager 122 pushes the register protection policy to the active security policy enforcer 117A.

The active security policy enforcer 117A communicates with the corresponding VMM 115A to request that writes to any specified register(s) are trapped to the VMI 116A. For instance, the active security policy enforcer 117A transmits an introspection command 225 through the VMI 116A to the VMM 115A to monitor one or more specified register(s) and trap them to the VMI 116A. The VMM 115A in turn translates the request to a hardware request. For instance, the VMM 115A programs the CPU 182 to serve those requests. The CPU 182 causes writes to those specified register(s) to be trapped to the requesting VMM 115A. Subsequently, the VMM 115A receives these register write traps and then passes these event(s) to the corresponding VMI 116A. Upon each event, the active security policy enforcer 117A stores the relevant state and determines whether the policy has been violated. For instance, if the policy is a limit on the number of writes to a specified register, the active security policy enforcer 117A determines the number of writes to that register. If the policy specifies the possible value(s) that the register may have, the active security policy enforcer 117A compares the value of the pending write to the register against the possible values. If the policy has been violated, one or more remedial actions are taken. For instance, the violation may be logged and/or the write may be blocked.

Figure 4:
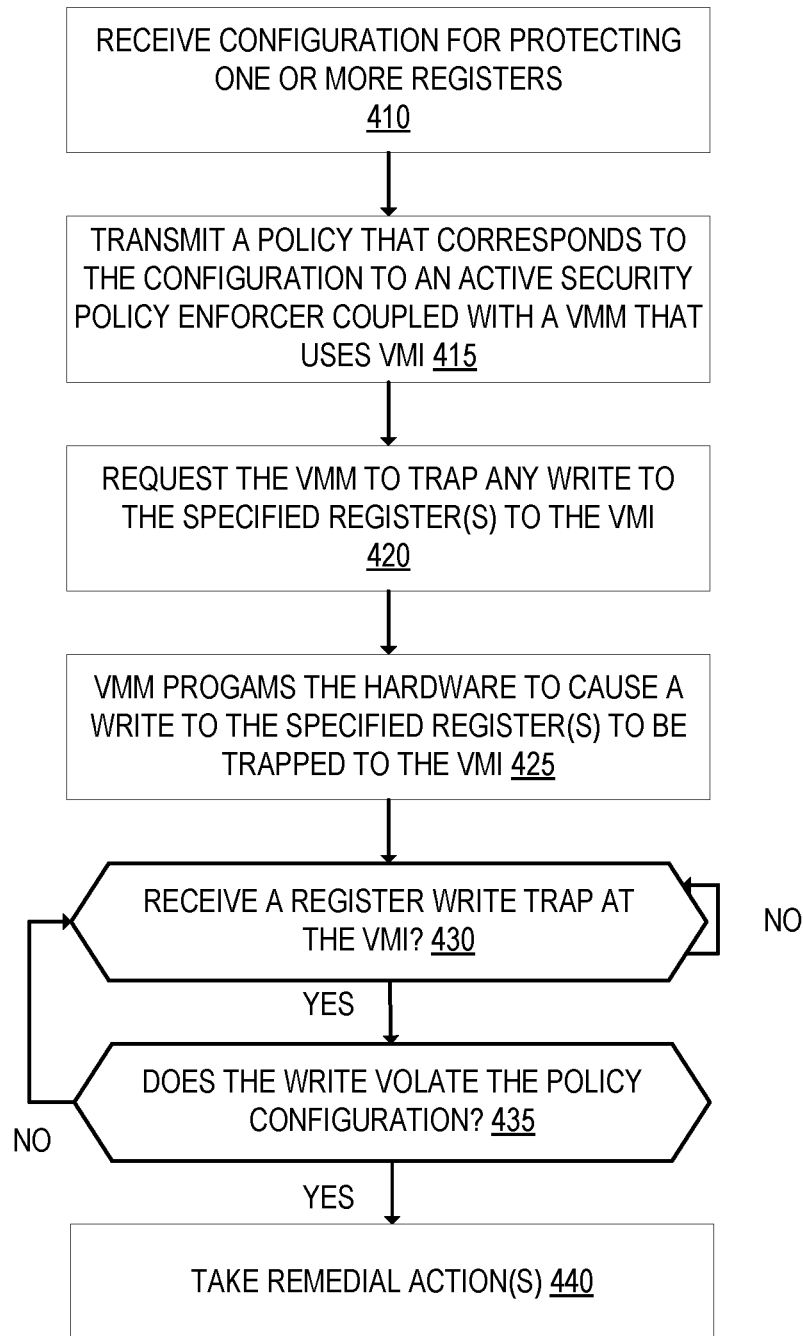
FIG. 4 is a flow diagram that illustrates exemplary operations for enforcing register protection according to an embodiment.

FIG. 4 is a flow diagram that illustrates exemplary operations for enforcing register protection according to an embodiment. The operations of FIG. 4 are described with the exemplary embodiment of FIG. 1. However, the operations of FIG. 4 can be performed by embodiments different from that of FIG. 1, and the embodiment of FIG. 1 can perform operations different from the operations of FIG. 4.

At operation 410, the policy manager 122 receives configuration for protecting one or more registers. The received configuration may be received from a user or administrator of the computing device 100, and the received configuration may be received locally or remotely through the management service 121. The received configuration may specify the number of times a register may be written, the value(s) a register may have, and/or which bits of the register the previous two policies should affect. The received configuration may also specify the guest operating system or guest application for which the policy applies.

Next, at operation 415, the policy manager 122 transmits a policy that corresponds to the configuration to an active security policy enforcer 117 coupled with a VMM 115 that uses VMI 116. In an embodiment, the policy manager 122 pushes the policy to that active security policy enforcer 117 as an action request. Next, at operation 420, the receiving active security policy enforcer 117 requests the VMM 115 to trap any write(s) to the specified register(s) to the VMI 116. Then, at operation 425, the VMM 115 programs the hardware (e.g., the CPU 182) to cause a write to the specified register(s) to be trapped to the VMI 116. Subsequently, when a write to the specified register(s) is being attempted, a register write trap will occur.

After registering for the write trap, the system continuously monitors for the write trap until the configuration is changed and/or the operating system or virtual machine is shut down. At operation 430, if a register write trap is received at the VMI 116, then operation moves to operation 435. If a register write trap is received, the event is passed to the active security policy enforcer 117 that determines, at operation 435, whether the write violates the policy configuration. For instance, if the policy configuration specified that the value of the register could only be one of a set of values and the value being written is not one of those values, then the policy would be violated. As another example, if the policy configuration specified a number of times the register could be written, the active security policy enforcer 117 determines whether this write would exceed that specified number, which would then be a violation of the policy. If the write does not violate the policy, then flow moves back to operation 430. If the write violates the policy, then operation 440 is performed where one or more remedial actions are taken. For instance, the violation can be logged and/or the write can be blocked.

As an exemplary policy, a process allow list policy may be enforced by the virtualized system. The process allow list policy may be created to specify which processes are allowed to be run on the system. The process allow list policy may be received from a user or administrator of the computing device 100, and the received configuration may be received locally or remotely through the management service 121. The received configuration may identify the process(es) that are allowed to run for a particular guest OS. The processes may be identified by their name, or by the complete path of the binary of the process and a secure hash of the target binary.

In an embodiment, upon the start of the policy manager 122 or after the policy configuration is received by the policy manager 122, the policy manager 122 pushes a policy to a particular one of the active security policy enforcers 117A-117N for which the process allow list is to apply. The decision on what guest operating system or application for which the policy is to apply may depend on the configuration of the computing device 100. For the purposes of this example, the policy manager 122 pushes a process allow list policy to the active security policy enforcer 117A. The policy manager 122 may also push the profile of the target system to the active security policy enforcer 117A, which defines information such as the location of functions within the target kernel. The semantic layer in the VMI 116 uses the provided profile to identify the kernel running in the guest system. Once identified, VMI 116 places a VMI breakpoint on the system calls that are responsible for starting new processes. For instance, in the case of Linux, this would be the execve system call. From this point forward, any attempt by the guest to start a new process will be trapped by VMI 116. In addition, VMI 116 will be able to determine the name of the application that should be started, since this information is generally passed as an argument to the process creation system calls that VMI intercepts.

When a new process is created at the guest, VMI 116 uses the process allow list to determine whether the process is allowed to run or violates the policy. For this purpose, VMI 116 may compare the name of the application that should be run against the list of processes on the process allow list. If the name of the binary is contained in the allow list, execution will continue normally, and the process will run. Otherwise, if the process is not contained in the process allow list, VMI 116 takes remedial action(s). For instance, the violation may be logged and/or the process may be blocked from running by shortcutting the system call and directly returning to the caller with a permission denied error code.

Figure 5:
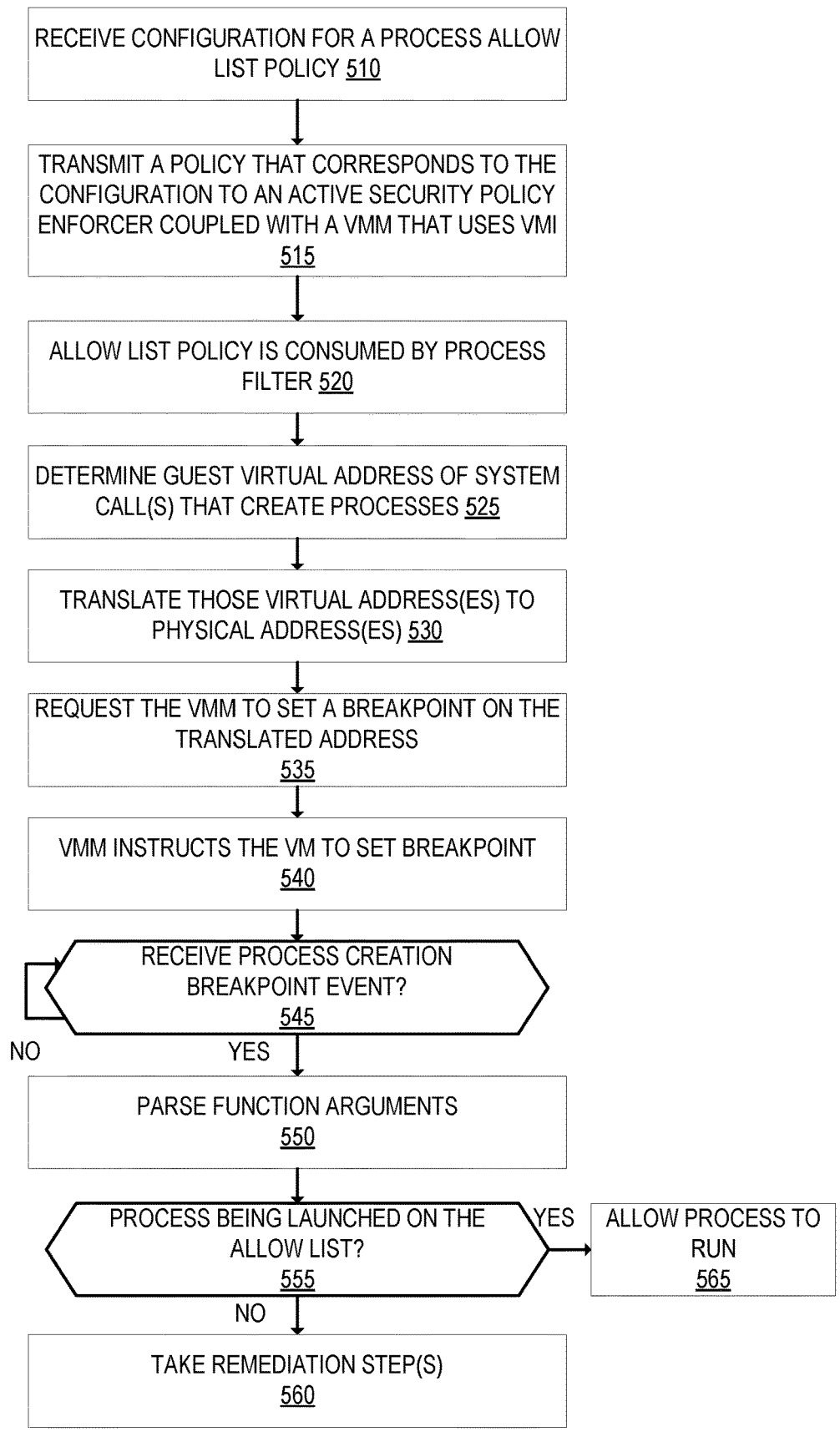
FIG. 5 is a flow diagram that illustrates exemplary operations for enforcing a process access policy according to an embodiment.

FIG. 5 is a flow diagram that illustrates exemplary operations for enforcing a process allow list policy according to an embodiment. The operations of FIG. 5 are described with the exemplary embodiment of FIG. 1. However, the operations of FIG. 5 can be performed by embodiments different from that of FIG. 1, and the embodiment of FIG. 1 can perform operations different from the operations of FIG. 5.

At operation 510, the policy manager 122 receives configuration for a process allow list policy. The received configuration may be received from a user or administrator of the computing device 100, and the received configuration may be received locally or remotely through the management service 121. The received configuration may identify the process(es) on the process allow list. The received configuration may also specify the guest operating system or guest application for which the policy applies.

Next, at operation 515, the policy manager 122 transmits a policy that corresponds to the configuration to an active security policy enforcer 117 coupled with a VMM 115 that uses VMI 116. In an embodiment, the policy manager 122 pushes the policy to that active security policy enforcer 117 as an action request. The policy manager 122 may also push the profile of the target system that allows the active security policy enforcer 117 to identify the guest operating system and make the location of its symbols and functions available to the VMI 116.

Next, at operation 520, the receiving active security policy enforcer 117 consumes the allow list policy at a process filter. Then, at operation 525, the active security policy enforcer 117 identifies the guest virtual address of the system call(s) that create process(es). For example, the semantic library may be consulted for the location of the process creation function in the guest OS. After locating the guest virtual address of the system call(s) that create processes, at operation 530, those virtual address(es) are translated to physical address(es). For instance, the virtual address of the process creation function is translated into a physical address. Next, at operation 535, the active security policy enforcer 117 requests the VMM 115 to set a breakpoint trap on the translated physical address(es). Next, at operation 540, the VMM 115 instructs the corresponding VM 108 to set the breakpoints within the guest OS 110.

When a breakpoint is hit (e.g., the process creation function in the guest OS 110 is called), the VMM 115 generates an event that is sent to the VMI 116. In this example, this event is called a process creation breakpoint event. At operation 545, the active security policy enforcer 117 determines whether a process creation breakpoint event has been received at the VMI 116. The process may loop at operation 545 until the policy has been removed from the system or until such an event is received. If a process creation breakpoint event has been received, then at operation 550 the active security policy enforcer 117 parses the function arguments of the process creation system calls to extract the name of the process that is about to run. Next, at operation 555, the active security policy enforcer 117 determines whether the process being launched is on the process allow list. For instance, the active security policy enforcer 117 compares the name of the process that is about to run against the allow list. If the process that is being launched is on the process allow list, then the process will be allowed to run at operation 565. If the process that is being launched is not on the process allow list, then one or more remediation steps are taken at operation 560. For example, the violation may be logged and/or the process creation call may be blocked (e.g., a permission denied error code may be returned to the caller).

Although FIG. 5 described the use of a process allow list, a process deny list policy can also be used. In such a case, operations like FIG. 5 are performed with the exception that instead of checking whether the process being launched is on the allow list, a determination is made whether the process being launched is on the deny list. If the process is on the deny list, then remediation steps are taken. If the process is not on the deny list, then the process is allowed to run.

Thus, process allow list policies and/or process deny list policies can be enforced in the virtualization stack, thus isolating it from attack. These embodiments can be used for any unmodified guest OS. Unlike conventional solutions that provide little to no configuration options and instead try to automatically identify malicious or benign binaries that lead to false positives and false negatives, embodiments described herein allow a user or administrator of the system to have complete control over which processes will be blocked and which will be able to run (no false positives and no false negatives). This allows for customization for the environment of the user or administrator.

As another exemplary policy, a driver allow list policy may be enforced by the virtualized system. The driver allow list policy may be created to specify which drivers are allowed to be loaded on the system. The driver allow list policy may be received from a user or administrator of the computing device 100, and the received configuration may be received locally or remotely through the management service 121. The received configuration may identify the driver(es) that are allowed to be loaded for a particular guest OS. The drivers may be identified by their name, or by the complete path of the driver and a secure hash of the driver.

In an embodiment, upon the start of the policy manager 122 or after the policy configuration is received by the policy manager 122, the policy manager 122 pushes a policy to a particular one of the active security policy enforcers 117A-117N for which the driver allow list is to apply. The decision on what guest operating system or application for which the policy is to apply may depend on the configuration of the computing device 100. For the purposes of this example, the policy manager 122 pushes a driver allow list policy to the active security policy enforcer 117. The policy manager 122 may also push the profile of the target system to the active security policy enforcer 117, which defines information such as the location of functions within the target kernel. The semantic layer in the VMI 116 uses the provided profile to identify the kernel running in the guest system. Once identified, VMI 116 places a VMI breakpoint on the system calls that are responsible for loading new drivers. For instance, in the case of Linux, this would be the init_module system call. From this point forward, any attempt by the guest to load a new driver will be trapped by VMI 116. In addition, VMI 116 will be able to determine the name of the driver that should be loaded, since this information is generally passed as an argument to the driver load system calls that VMI 116 intercepts.

When a new driver is attempted to be loaded at the guest, VMI 116 uses the driver allow list to determine whether the driver is allowed to load or violates the policy. For this purpose, VMI 116 may compare the name of the driver that should be loaded against the list of drivers on the drivers allow list. If the name of the driver is contained in the allow list, execution will continue normally, and the driver will be loaded. Otherwise, if the driver is not contained in the driver allow list, VMI 116 takes remedial action(s). For instance, the violation may be logged and/or the driver may be blocked from running by shortcutting the system call and directly returning to the caller with a permission denied error code.

Figure 6:
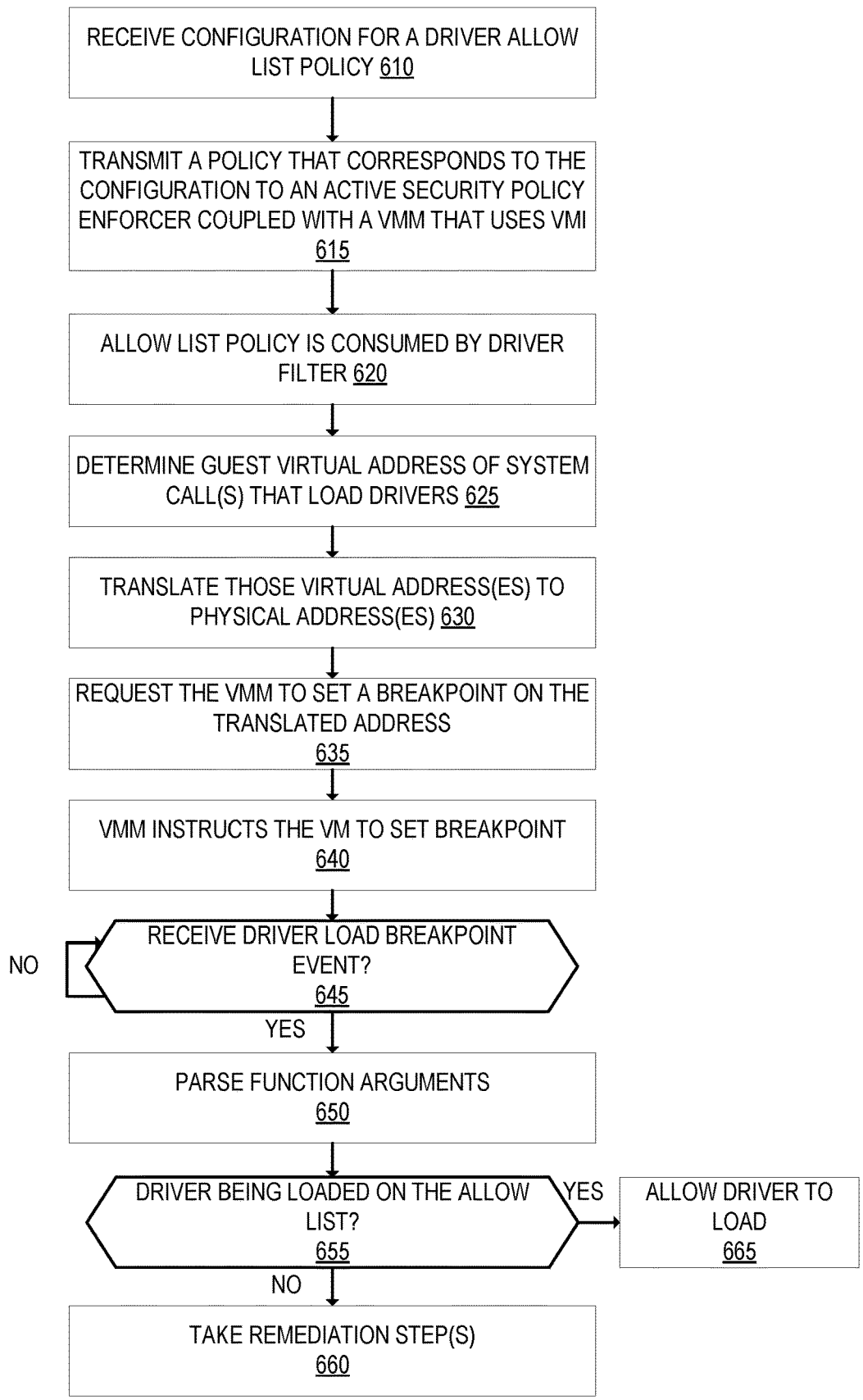
FIG. 6 is a flow diagram that illustrates exemplary operations for enforcing a driver access policy according to an embodiment.

FIG. 6 is a flow diagram that illustrates exemplary operations for enforcing a driver allow list policy according to an embodiment. The operations of FIG. 6 are described with the exemplary embodiment of FIG. 1. However, the operations of FIG. 6 can be performed by embodiments different from that of FIG. 1, and the embodiment of FIG. 1 can perform operations different from the operations of FIG. 6.

At operation 610, the policy manager 122 receives configuration for a driver allow list policy. The received configuration may be received from a user or administrator of the computing device 100, and the received configuration may be received locally or remotely through the management service 121. The received configuration may identify the driver(s) on the driver allow list. The received configuration may also specify the guest operating system or guest application for which the policy applies.

Next, at operation 615, the policy manager 122 transmits a policy that corresponds to the configuration to an active security policy enforcer 117 coupled with a VMM 115 that uses VMI 116. In an embodiment, the policy manager 122 pushes the policy to that active security policy enforcer 117 as an action request. The policy manager 122 may also push the profile of the target system that allows the active security policy enforcer 117 to identify the guest operating system and make the location of its symbols and functions available to the VMI 116.

Next, at operation 620, the receiving active security policy enforcer 117 consumes the allow list policy at a driver filter. Then, at operation 625, the active security policy enforcer 117 identifies the guest virtual address of the system call(s) that load drivers. For example, the semantic library may be consulted for the location of the driver load system calls (e.g., init_module system call). After locating the guest virtual address of the system call(s) that load drivers, at operation 630, those virtual address(es) are translated to physical address(es). For instance, the virtual address of the driver loading system call is translated into a physical address. Next, at operation 635, the active security policy enforcer 117 requests the VMM 115 to set a breakpoint trap on the translated physical address(es). Next, at operation 640, the VMM 115 instructs the corresponding VM 108 to set the breakpoints within the guest OS 110.

When a breakpoint is hit (e.g., the driver loading system call in the guest OS 110 is called), the VMM 115 generates an event that is sent to the VMI 116. In this example, this event is called a driver load breakpoint event. At operation 645, the active security policy enforcer 117 determines whether a driver load breakpoint event has been received at the VMI 116. The process may loop at operation 645 until the policy has been removed from the system or until such an event is received. If a driver load breakpoint event has been received, then at operation 650 the active security policy enforcer 117 parses the function arguments of the driver loading system calls to extract the name of the driver that is to be loaded. Next, at operation 655, the active security policy enforcer 117 determines whether the driver that is to be loaded is on the driver allow list. For instance, the active security policy enforcer 117 compares the name of the driver that is to be loaded against the allow list. If the driver that is to be loaded is on the driver allow list, then the driver will be allowed to load at operation 665. If the driver that is to be loaded is not on the driver allow list, then one or more remediation steps are taken at operation 660. For example, the violation may be logged and/or the driver load system call may be blocked (e.g., a permission denied error code may be returned to the caller).

Although FIG. 6 described the use of a driver allow list, a driver deny list policy can also be used. In such a case, operations like FIG. 6 are performed with the exception that instead of checking whether the driver that is to be loaded is on the allow list, a determination is made whether the driver to be loaded is on the deny list. If that driver is on the deny list, then remediation steps are taken. If the driver is not on the deny list, then the driver is allowed to load.

Thus, driver allow list policies and/or driver deny list policies can be enforced in the virtualization stack, thus isolating it from attack. These embodiments can be used for any unmodified guest OS. Unlike conventional solutions that provide little to no configuration options and instead rely on certificates to determine whether a driver is trustworthy, embodiments described herein allow a user or administrator of the system to have complete control over which drivers will be blocked and which will be able to load. This allows for customization for the environment of the user or administrator.

As another exemplary policy, a data structure integrity policy may be enforced by the virtualized system. The data structure integrity policy may be created to specify which in-guest data structure(s) are to be integrity protected, with or without the assistance of the virtual machine. The data structure integrity policy may be received from a user or administrator of the computing device 100, and the received configuration may be received locally or remotely through the management service 121. The received configuration may identify the data structure(s) that are to be integrity protected. The configuration may specify the memory access permissions to be enforced. The configuration may also specify the action that should be taken in case of a policy violation.

In an embodiment, upon the start of the policy manager 122 or after the policy configuration is received by the policy manager 122, the policy manager 122 pushes a policy to a particular one of the active security policy enforcers 117A-117N for which the data structure integrity policy is to apply. The decision on what guest operating system or application for which the policy is to apply may depend on the configuration of the computing device 100. For the purposes of this example, the policy manager 122 pushes a data structure integrity policy to the active security policy enforcer 117. The policy manager 122 may also push the profile of the target system to the active security policy enforcer 117, which defines information such as the location (in the guest virtual memory) of the given data structures. The semantic layer in the VMI 116 uses the provided profile to identify the guest operating system and the guest virtual addresses of the identified data structures for which integrity is to be protected.

By leveraging VMM, the active security policy enforcer 117 can use VMI 116 to configure the provided memory access permissions in the second level address translation tables to enforce unauthorized accesses to the particular data structure. Each time the guest violates the policy, a memory access violation event is received and the active security policy enforcer 117 takes one or more actions according to the configuration. For instance, the violation may be logged (the memory permission may be at least temporarily granted and the instruction that generated the memory violation may be single-stepped) and execution continues, or the violation may be logged and the process terminated.

Figure 7:
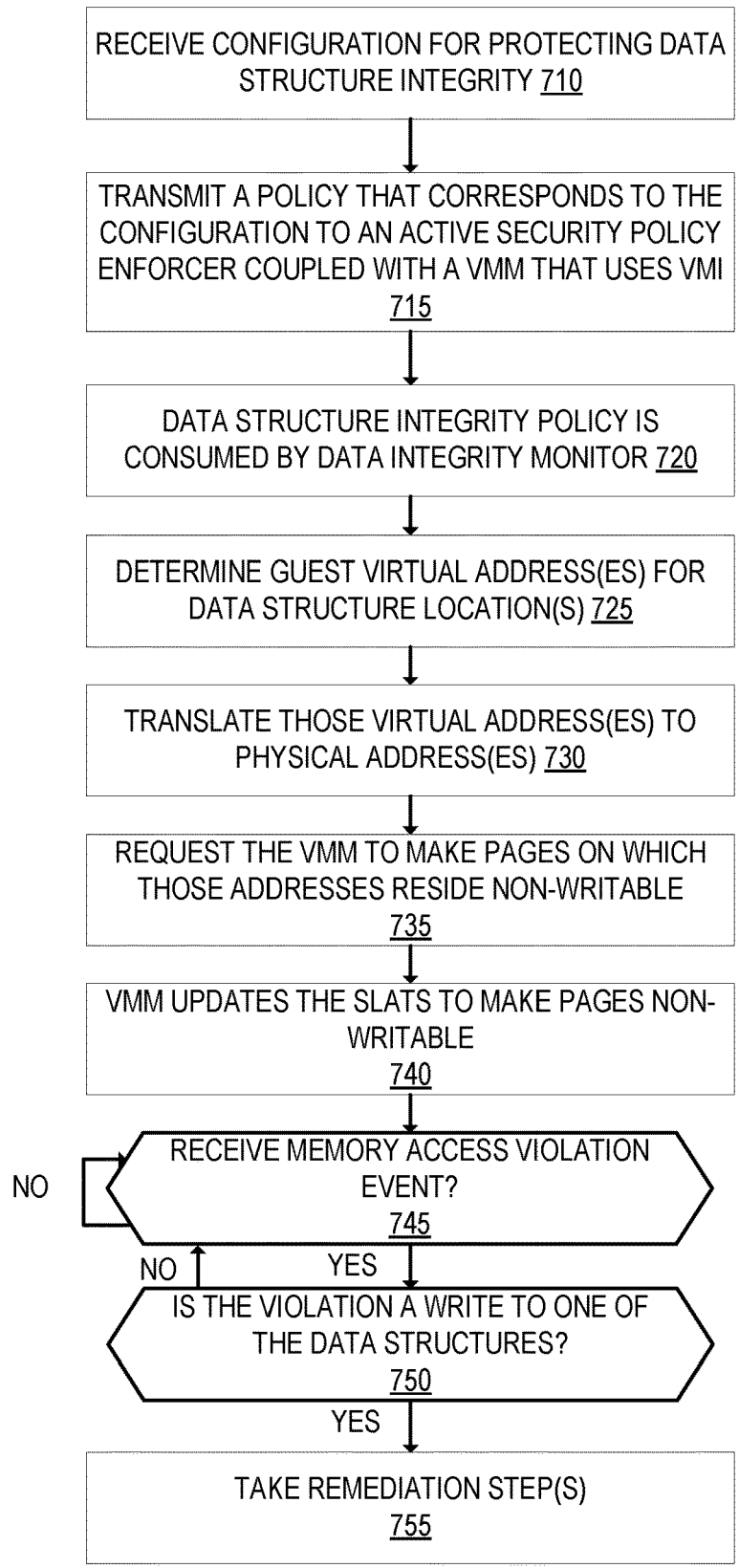
FIG. 7 is a flow diagram that illustrates exemplary operations for enforcing a data structure integrity policy according to an embodiment.

FIG. 7 is a flow diagram that illustrates exemplary operations for enforcing a data structure integrity policy according to an embodiment. The operations of FIG. 7 are described with the exemplary embodiment of FIG. 1. However, the operations of FIG. 7 can be performed by embodiments different from that of FIG. 1, and the embodiment of FIG. 1 can perform operations different from the operations of FIG. 7.

At operation 710, the policy manager 122 receives configuration for a data structure integrity policy. The received configuration may be received from a user or administrator of the computing device 100, and the received configuration may be received locally or remotely through the management service 121. The received configuration may identify the data structure(s) to integrity protect. The configuration may specify the memory access permissions to be enforced. The configuration may also specify the action that should be taken in case of a policy violation. The received configuration may also specify the guest operating system or guest application for which the policy applies.

Next, at operation 715, the policy manager 122 transmits a policy that corresponds to the configuration to an active security policy enforcer 117 coupled with a VMM 115 that uses VMI 116. In an embodiment, the policy manager 122 pushes the policy to that active security policy enforcer 117 as an action request. The policy manager 122 may also push the profile of the target system that allows the active security policy enforcer 117 to identify the guest operating system to the VMI 116.

Next, at operation 720, the receiving active security policy enforcer 117 consumes the data structure integrity policy at a data integrity monitor. Then, at operation 725, the active security policy enforcer 117 determines the guest virtual address(es) of the location(s) of the data structure(s) identified in the data structure integrity policy. Next, at operation 730, those virtual address(es) are translated to physical address(es). Next, at operation 735, the active security policy enforcer 117 requests the VMM 115 to make pages on which those physical address(es) reside non-writable. Next, at operation 740, the VMM 115 updates the second level address translation tables to make the pages non-writable. The VMI 116 will be notified each time the guest violates the configured memory access permissions when accessing the identified data structures. Thus, if a memory access violation is received, the VMM 115 generates an event that is sent to the VMI 116. In this example, the event is called a memory access violation event. At operation 745, the active security policy enforcer 117 determines whether a memory access violation event has been received at the VMI 116. The process may loop at operation 745 until the policy has been removed from the system or until such an event is received. If a memory access violation event has been received, then at operation 750 the active security policy enforcer 117 determines if the violation is a write to one of the specified data structures. If the violation is not a write to one of the specified data structures, in an embodiment the flow moves back to operation 745. If the violation is a write to one of the specified data structures, then one or more remediation steps are taken at operation 755. For instance, the violation may be logged (the memory permission may be at least temporarily granted and the instruction that generated the memory violation may be single-stepped) and execution continues, or the violation may be logged and the process terminated.

Thus, data structure integrity can be enforced in the virtualization stack, thus isolating it from attack. These embodiments can be used for any unmodified guest OS. Example data structures that may be protected include the system call table or the interrupt vector table, which can be abused by adversaries to take control over the system.

As another exemplary policy, a code integrity policy may be enforced by the virtualized system. The code integrity policy may be created to protect a set of code regions, such as system call handlers. The policy configuration may specify a list of code functions, the integrity of which is to be protected using virtualization techniques described herein. The code integrity policy may be received from a user or administrator of the computing device 100, and the received configuration may be received locally or remotely through the management service 121. The received configuration may identify the list of code functions that are to be integrity protected. The configuration may specify the memory access permissions to be enforced. The configuration may also specify the action that should be taken in case of a policy violation.

In an embodiment, upon the start of the policy manager 122 or after the policy configuration is received by the policy manager, the policy manager 122 pushes a policy to a particular one of the active security policy enforcers 117A-117N for which the code integrity policy is to apply. The decision on what guest operating system or application for which the policy is to apply may depend on the configuration of the computing device 100. For the purposes of this example, the policy manager 122 pushes a code integrity policy to the active security policy enforcer 117. The policy manager 122 may also push the profile of the target system to the active security policy enforcer 117, which defines information such as the location (in the guest virtual memory) of the code regions. The semantic layer in the VMI 116 uses the provided profile to identify the guest operating system and the guest virtual addresses of the identified code regions for which integrity is to be protected.

By leveraging VMM, the active security policy enforcer 117 can use VMI 116 to configure the provided memory access permissions in the second level address translation tables to enforce unauthorized accesses to the particular code. Each time the guest violates the policy, a memory access violation event is received and the active security policy enforcer 117 takes one or more actions according to the configuration. For instance, the violation may be logged (the memory permission may be at least temporarily granted and the instruction that generated the memory violation may be single-stepped) and execution continues, or the violation may be logged and the process terminated.

Figure 8:
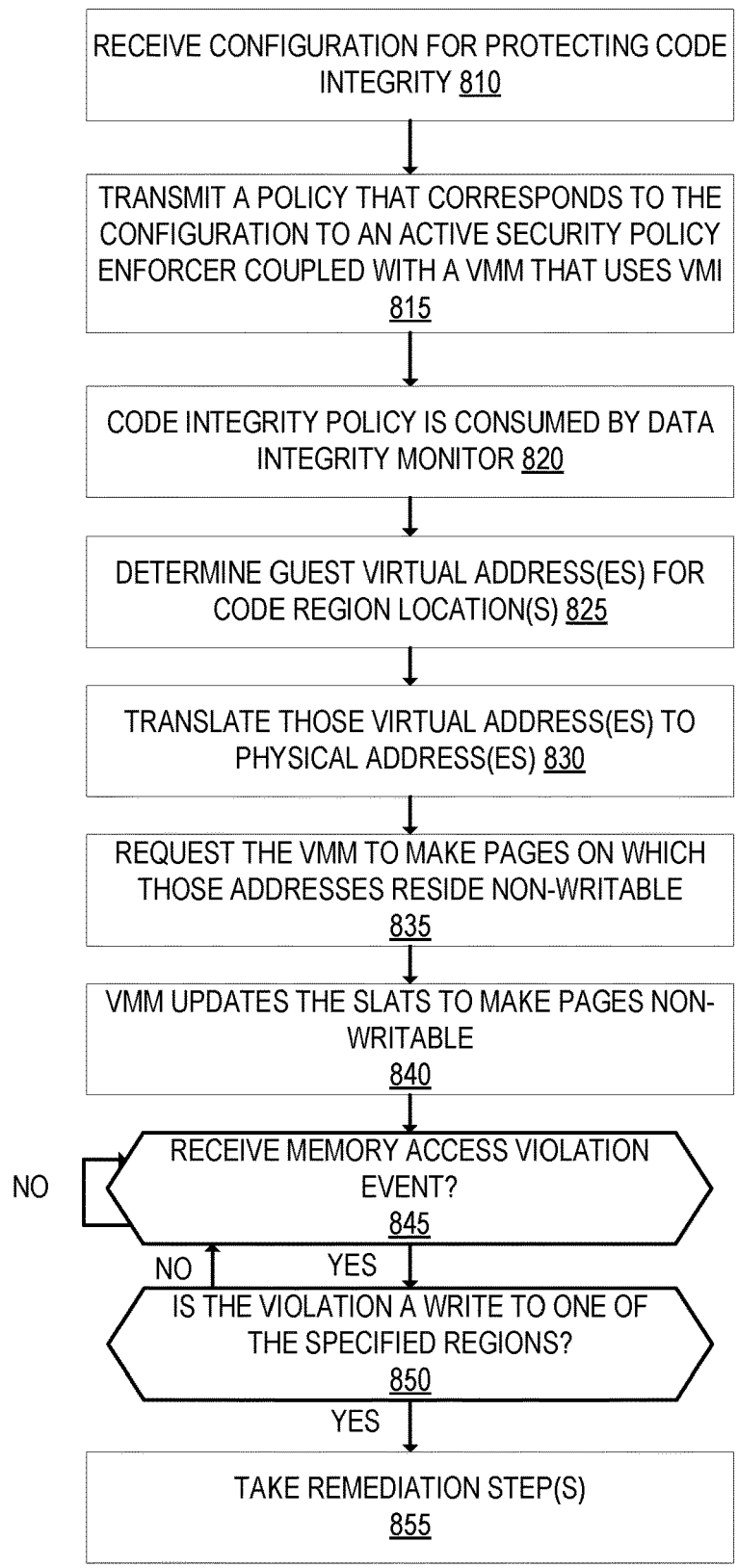
FIG. 8 is a flow diagram that illustrates exemplary operations for enforcing code integrity policy according to an embodiment.

FIG. 8 is a flow diagram that illustrates exemplary operations for enforcing code integrity policy according to an embodiment. The operations of FIG. 8 are described with the exemplary embodiment of FIG. 1. However, the operations of FIG. 8 can be performed by embodiments different from that of FIG. 1, and the embodiment of FIG. 1 can perform operations different from the operations of FIG. 8.

At operation 810, the policy manager 122 receives configuration for a code integrity policy. The received configuration may be received from a user or administrator of the computing device 100, and the received configuration may be received locally or remotely through the management service 121. The received configuration may identify a list of code functions to integrity protect. The configuration may specify the memory access permissions to be enforced. The configuration may also specify the action that should be taken in case of a policy violation. The received configuration may also specify the guest operating system or guest application for which the policy applies.

Next, at operation 815, the policy manager 122 transmits a policy that corresponds to the configuration to an active security policy enforcer 117 coupled with a VMM 115 that uses VMI 116. In an embodiment, the policy manager 122 pushes the policy to that active security policy enforcer 117 as an action request. The policy manager 122 may also push the profile of the target system that allows the active security policy enforcer 117 to identify the guest operating system to the VMI 116.

Next, at operation 820, the receiving active security policy enforcer 117 consumes the code integrity policy at a data integrity monitor. Then, at operation 825, the active security policy enforcer 117 determines the guest virtual address(es) of the location(s) of the code region(s) identified in the code integrity policy. Next, at operation 830, those virtual address(es) are translated to physical address(es). Next, at operation 835, the active security policy enforcer 117 requests the VMM 115 to make pages on which those physical address(es) reside non-writable. Next, at operation 840, the VMM 115 updates the second level address translation tables to make the pages non-writable. The VMI 116 will be notified each time the guest violates the configured memory access permissions when accessing the identified code regions. Thus, if a memory access violation is received, the VMM 115 generates an event that is sent to the VMI 116. In this example, the event is called a memory access violation event. At operation 845, the active security policy enforcer 117 determines whether a memory access violation event has been received at the VMI 116. The process may loop at operation 845 until the policy has been removed from the system or until such an event is received. If a memory access violation event has been received, then at operation 850 the active security policy enforcer 117 determines if the violation is a write to one of the specified code regions. If it is, then one or more remediation steps are taken at operation 855. For instance, the violation may be logged (the memory permission may be at least temporarily granted and the instruction that generated the memory violation may be single-stepped) and execution continues, or the violation may be logged and the process terminated. Thus, code integrity can be enforced in the virtualization stack, thus isolating it from attack. These embodiments can be used for any unmodified guest OS. If the violation is not a write to one of the specified code regions, then in an embodiment the flow moves back to operation 845.

The exemplary architecture shown in FIG. 1 can be used in different hardware architectures including ARM architectures and x86 architectures. For example, FIG. 9 is a block diagram that shows an exemplary implementation for the formally verified trusted computing base as shown in FIG. 1 for an ARM architecture, and FIG. 10 is a block diagram that shows an exemplary implementation for the formally verified trusted computing base as shown in FIG. 1 for an x86 architecture.

Figure 9:
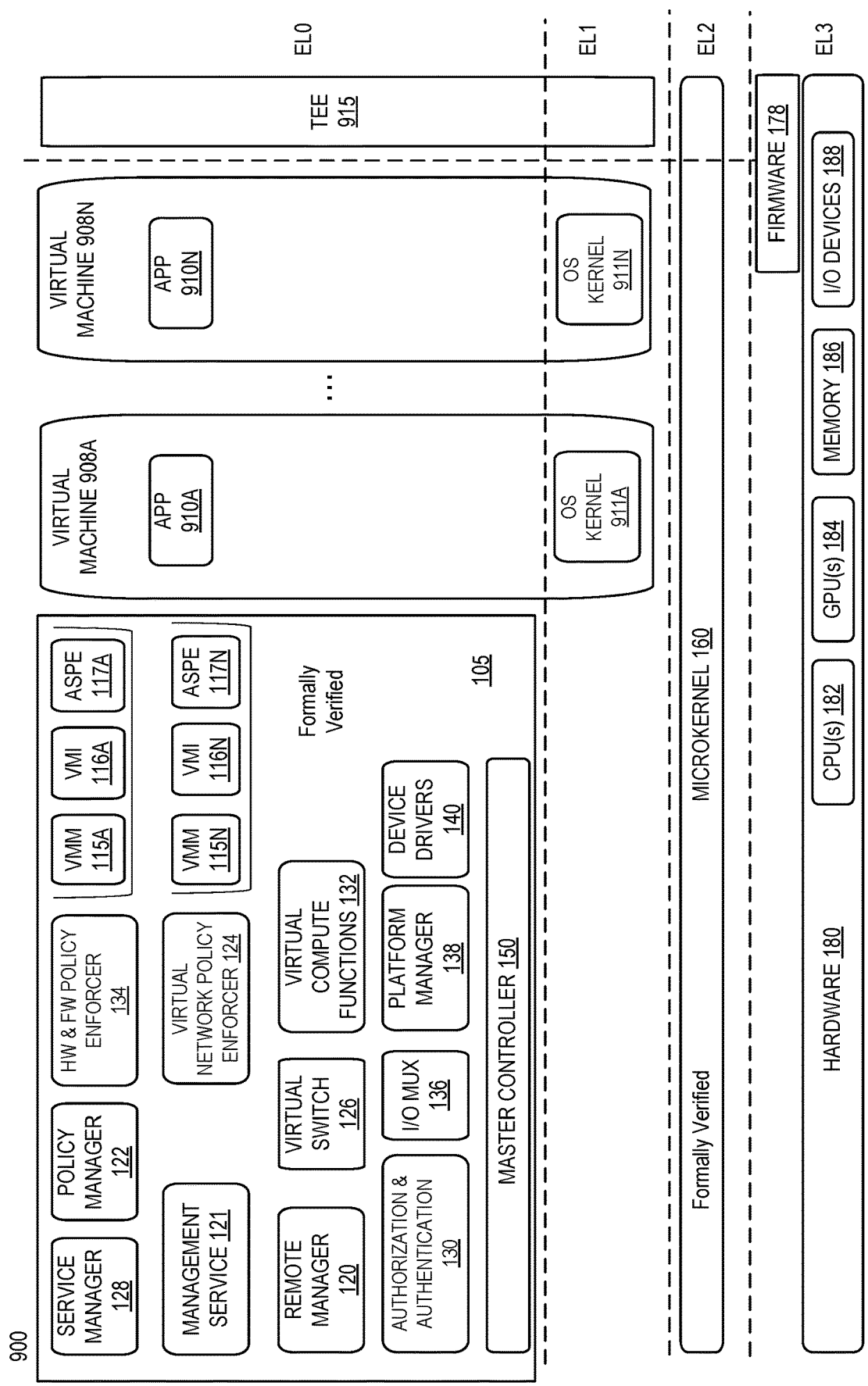
FIG. 9 is a block diagram that shows an exemplary implementation for the formally verified trusted computing base as shown in FIG. 1 for an ARM architecture.

The exemplary implementation shown in FIG. 9 is for an ARM architecture. The computing device 900 is a computing device like the computing device 100 and has an ARM architecture (e.g., ARMv8). ARM defines different levels of privilege as exception levels. Each exception level is numbered, and the higher levels of privilege have higher numbers. Exception level 0 (EL0) is known as the application privilege level. All the hypervisor components except for the microkernel 160 are in the exception level 0. The applications 910A-910N executing within the virtual machines 908A-908N are also in exception level 0. The OS kernels 911A-911N executing within the virtual machines 908A-908N are in exception level 1 (EL1), which is the rich OS exception level. The formally verified microkernel 160 is in exception level 2 (EL2), which is the hypervisor privilege level. The firmware 178 and the hardware 180 are at exception level 3 (EL3), which is the firmware privilege level and the highest privilege level. The trusted execution environment (TEE) 915 is at the exception level 0 and 1 for the trusted services and kernel respectively.

Figure 10:
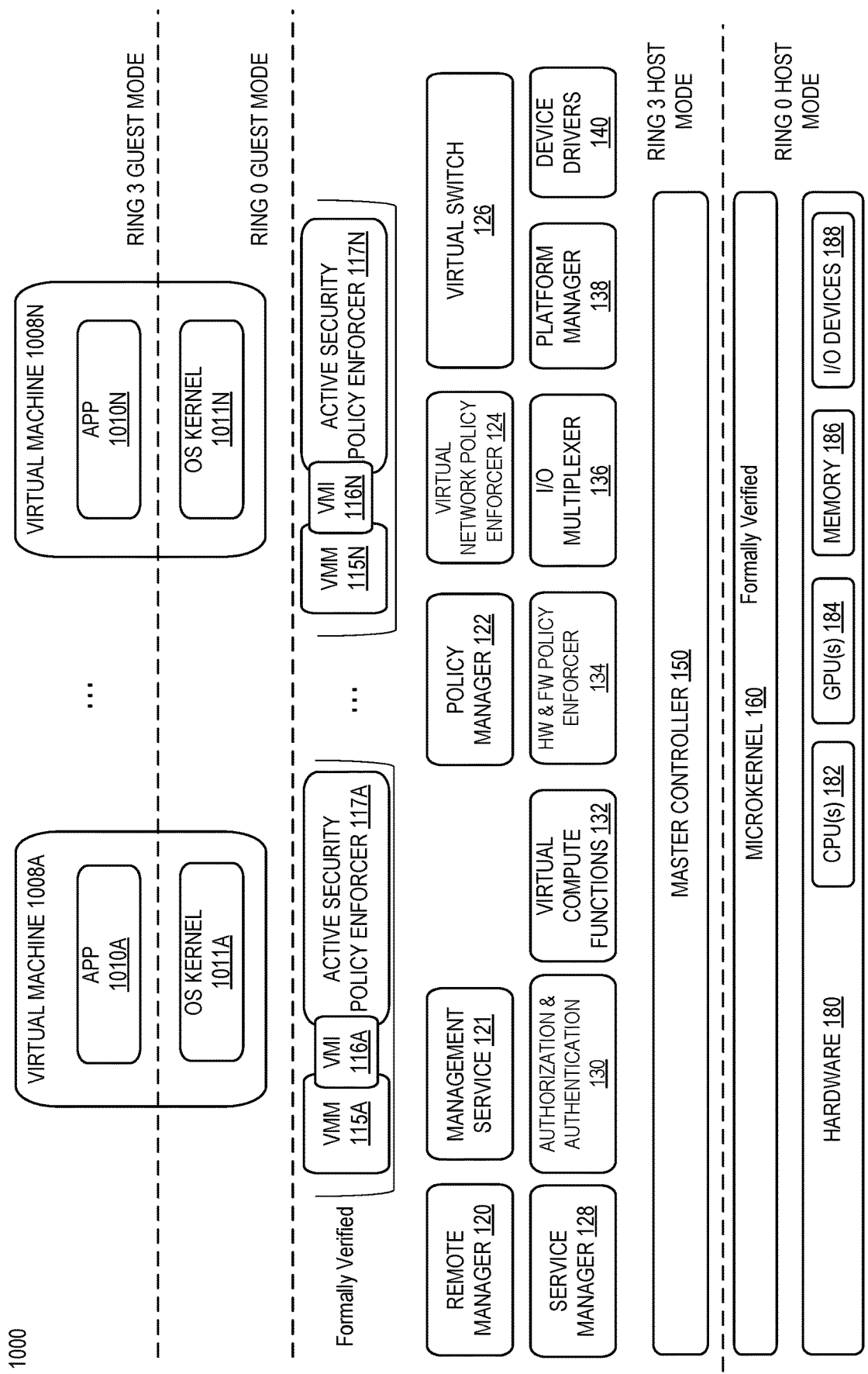
FIG. 10 is a block diagram that shows an exemplary implementation for the formally verified trusted computing base as shown in FIG. 1 for an x86 architecture.

The exemplary implementation shown in FIG. 10 is for an x86 architecture. The computing device 1000 is a computing device like the computing device 100 and has an x86 architecture. The x86 architecture defines four protection rings but most modern architectures use two privilege levels, rings 0 and 3 and may run in guest or host mode. For instance, the guest OS kernels 1011A-1011N running in the virtual machines 1008A-1008N respectively run in the most privileged level (guest kernel mode, ring 0), and the guest applications 1010A-1010N run in a lesser privileged level (guest user mode, ring 3). The formally verified microkernel 160 runs in the most privileged level of the host (host kernel mode, ring 0), and the other components of the hypervisor run in a lesser privileged level (host user mode, ring 3).

Figure 11:
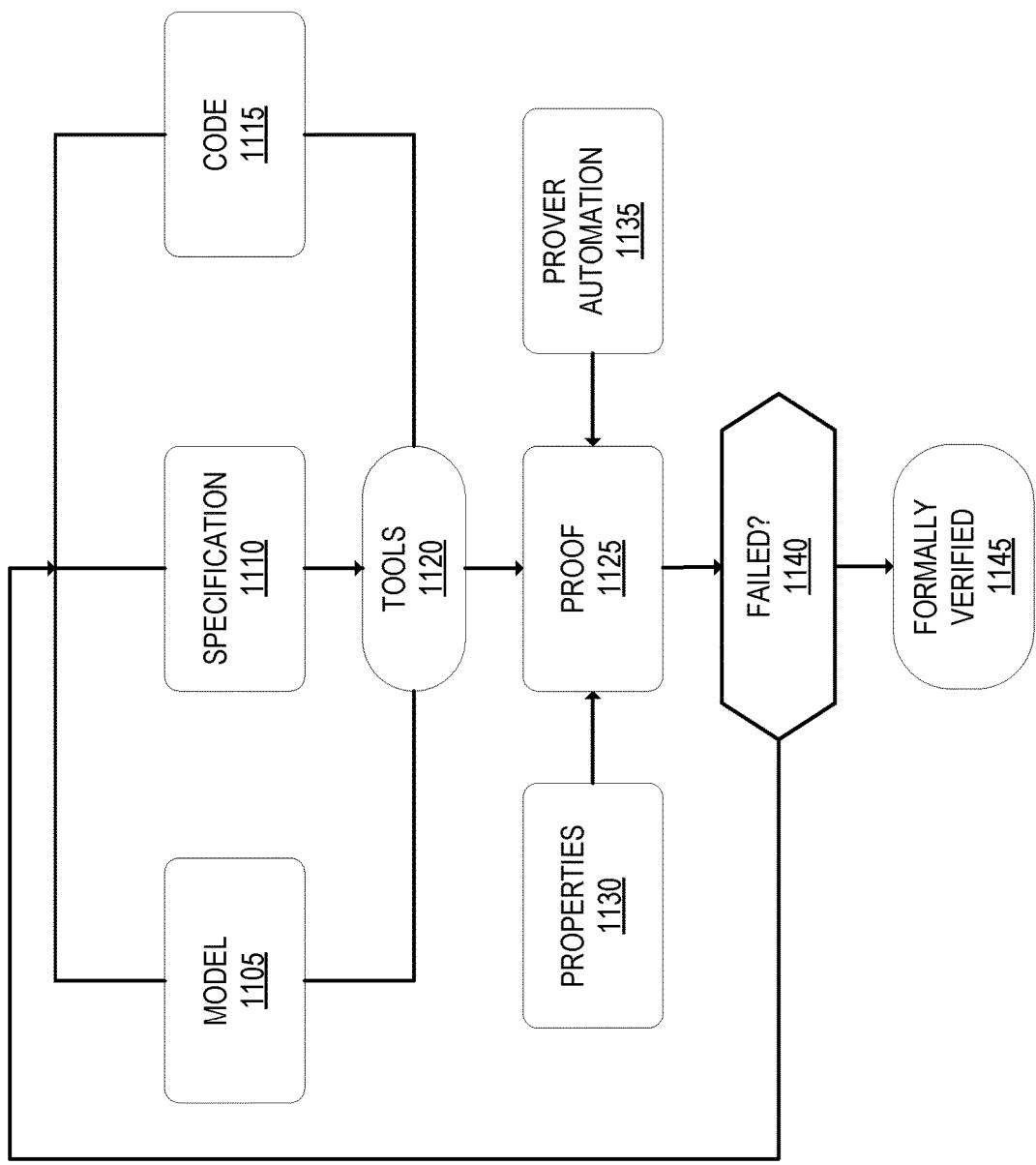
FIG. 11 is a flow chart that illustrates an exemplary method of formal verification that may be used in some embodiments.

Multiple components of the virtualization layer are formally verified components in some embodiments. Formal verification proves (or disproves) the correctness of intended code using formal methods of mathematics. Formal verification guarantees that a system is free of programming errors. FIG. 11 is a flow chart that illustrates an exemplary method of formal verification that may be used in some embodiments. A model 1105 of the code 1115 is created. The model 1105 is the functional implementation corresponding to the code 1115. The specification 1110 is a formal specification of the properties of the code 1115 expressed in a mathematical language. The code 1115 itself may be coded in a way that is architecture to be formally verified. The tools 1120 may include tools for converting the code 1115 into file(s) suitable for an interactive theorem prover 1135. The properties 1130 include any security properties or any theorems used for proving the code 1115. If the proof 1125 fails at block 1140, then the code 1115 is not formally verified. If the proof is verified, then the code 1115 is deemed to be formally verified 1145.

Figure 12:
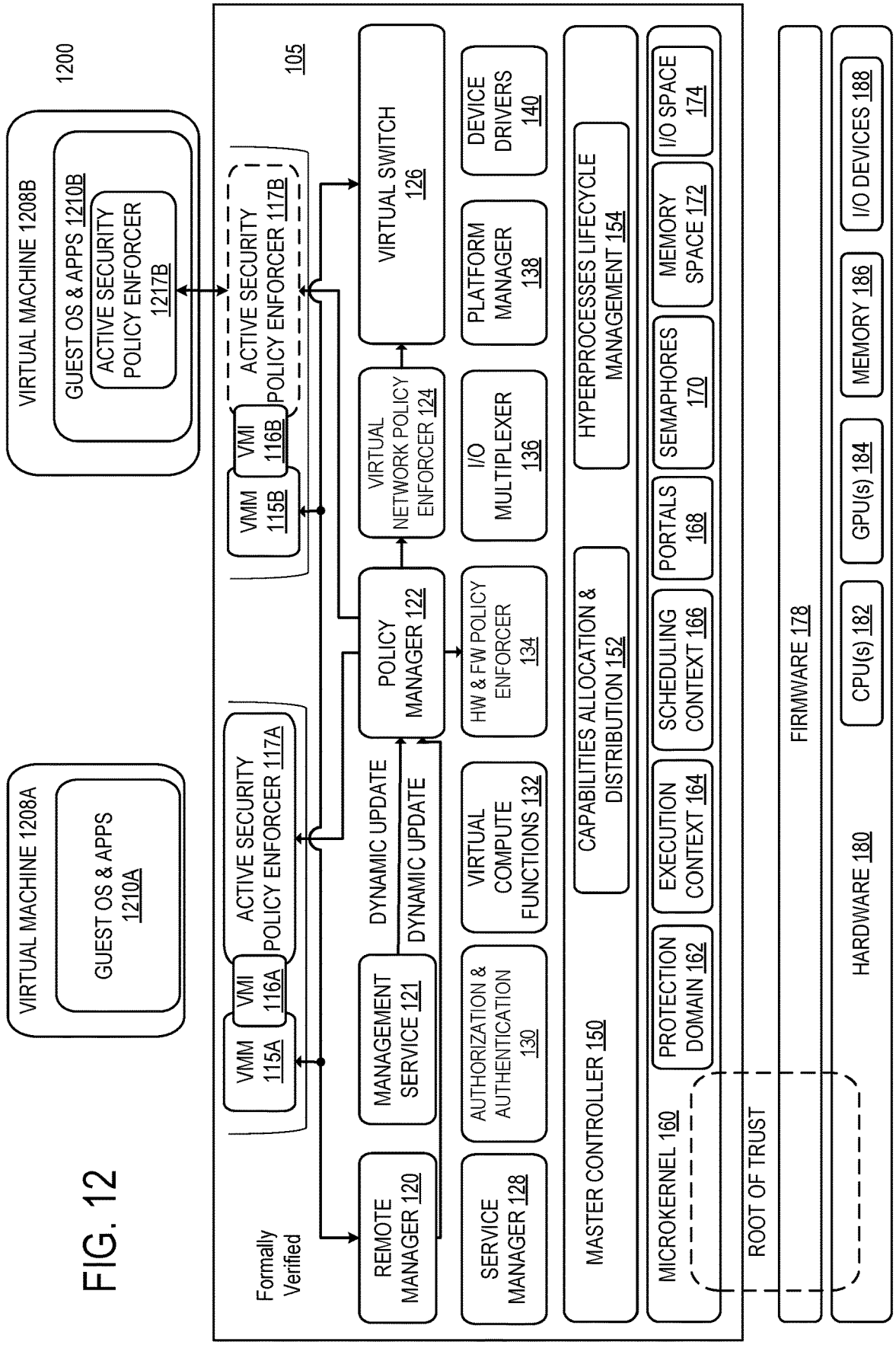
FIG. 12 illustrates an example use of the formally verified trusted computing base with active security and policy enforcement, according to an embodiment.

FIG. 12 illustrates an example use of the formally verified trusted computing base with active security and policy enforcement, according to an embodiment. The computing device 1200 is like the computing device 100. However, in the example shown in FIG. 12, there are two virtual machines 1208A and 1208B that are running, where the virtual machine 1208A has an unmodified guest operating system and applications 1210A, and the virtual machine 1208B has a piece of software installed to assist in the active security policy enforcement (the active security policy enforcer 1217B). Thus, the policy enforcement including the active security policy enforcement that impacts the guest operating system and applications 1210A are performed by the virtualization system like as described with respect to FIG. 1. However, the active security policy enforcement for the guest operating system and applications 1210B are performed in coordination with the guest. In such a case, memory encryption may be in use for the guest operating system and applications 1210B such that outside of the guest there is no visibility of the memory. In an embodiment, the active security policy enforcer 1217B is an image of the active security policy enforcer 117B. The active security policy enforcer 117B controls the active security policy enforcer 1217B. For instance, the active security policy enforcer 117B communicates active security policies to the active security policy enforcer 1217B. The active security policy enforcer 1217B may also perform VMI and provide at least read or write to the main memory of the guest.

Figure 13:
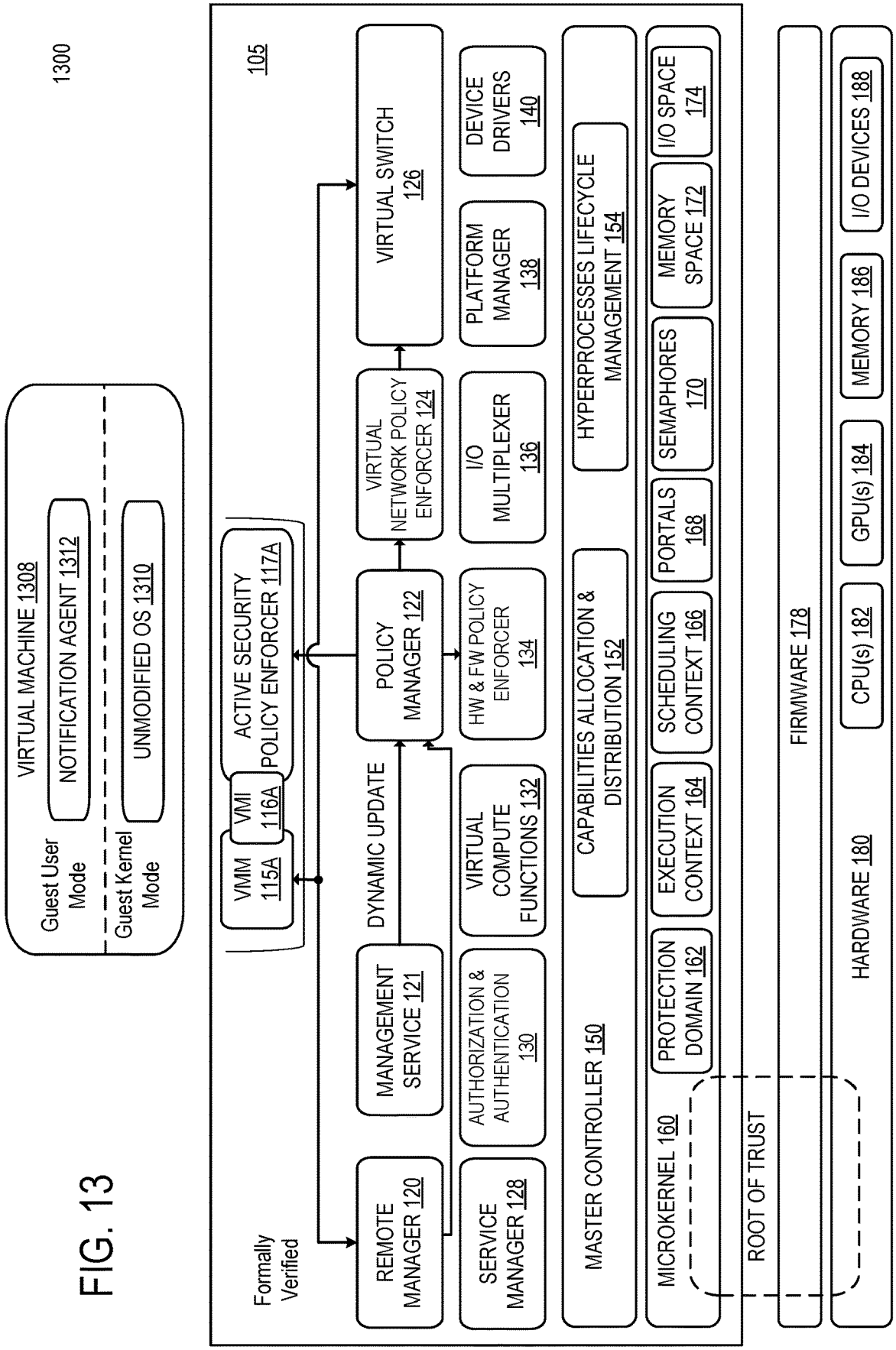
FIG. 13 illustrates an example use of the formally verified trusted computing base with active security and policy enforcement, according to an embodiment.

FIG. 13 illustrates an example use of the formally verified trusted computing base with active security and policy enforcement, according to an embodiment. The computing device 1300 is like the computing device 100. However, in the example shown in FIG. 13, the virtual machine 1308 includes an unmodified OS 1310 running in guest kernel mode and a notification agent 1312 that runs in the guest user mode space. The notification agent 1312 is used to notify a user of an event that has been detected by the virtualization system. The policy manager 122 may communicate with the notification agent 1312. The event may be those in which the user has configured some interest in receiving and/or that an administrator of the system has configured. For instance, a popup may occur when a violation of a policy has occurred such as a detection of malware. Although FIG. 13 illustrates a single virtual machine, there may be notification agents running on multiple virtual machines at the same time.

The techniques shown in the figures can be implemented using code and data stored and executed on one or more computing devices. Such computing devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more hardware processors coupled to one or more other components, such as one or more I/O devices (e.g., storage devices (non-transitory machine-readable storage media), a keyboard, a touchscreen, a display, and/or network connections). The coupling of the set of processors and other components is typically through one or more busses and bridges (also termed as bus controllers). Thus, the storage device of a given computing device typically stores code and/or data for execution on the set of one or more processors of that computing device.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computing device, comprising:
a plurality of hardware resources including a set of one or more hardware processors, memory, and storage devices, wherein the storage devices include instructions that when executed by the set of hardware processors, cause the computing device to operate a virtualized system, the virtualized system including:
a set of one or more virtual machines (VMs) that execute one or more guest operating systems;
a formally verified microkernel running in a most privileged level to abstract hardware resources of the computing device, wherein the formally verified microkernel controls access to the hardware resources using explicit authorization; and
a plurality of formally verified hyper-processes including:
a set of one or more virtual machine monitors (VMMs) corresponding to the set of one or more VMs respectively, wherein a particular VMM manages interactions between the corresponding VM and physical resources of the computing device;
a set of one or more active security policy enforcers corresponding to the set of one or more VMMs respectively, wherein each active security policy enforcer uses virtual machine introspection (VMI) for introspection of at least some of the hardware resources including one or more hardware processors, wherein each active security policy enforcer enforces a plurality of policies based at least in part on the introspection; and
a virtual switch coupled with each of the VMMs, wherein the virtual switch is not directly coupled with any of the set of VMs, wherein a virtual network policy enforcer enforces a set of one or more network policies at the virtual switch that affect communication of the one or more guest operating systems.

2. The computing device of claim 1, wherein policies are dynamically received remotely and installed to the set of one or more active security policy enforcers.

3. The computing device of claim 1, wherein the plurality of formally verified hyper-processes further includes a policy manager that manages policies for the virtualized system.

4. The computing device of claim 3, wherein the policy manager is configured to receive events from the set of active security policy enforcers, and wherein the policy manager is configured to disconnect network access from one of the guest operating systems upon a particular policy violation.

5. The computing device of claim 1, wherein the plurality of formally verified hyper-processes further includes a hardware and firmware policy enforcer.

6. The computing device of claim 1, wherein one of the plurality of policies is a process allow policy that indicates a set of one or more processes that are allowed to be executed by a particular one of the one or more guest operating systems.

7. The computing device of claim 1, wherein at least one of the one or more VMs that executes a guest operating system includes a local active security policy enforcer that can interact with encrypted memory used by the guest operating system.

8. The computing device of claim 1, wherein at least one of the one or more VMs includes a notification agent running in guest user mode space, wherein the notification agent is configured to notify a user of a detected event including a violation of policy.

9. A method in a computing device, comprising:
executing a formally verified microkernel in a most privileged level to abstract hardware resources of the computing device, wherein the formally verified microkernel controls access to the hardware resources using explicit authorization;
executing a plurality of virtual machine monitors (VMMs), wherein each of the plurality of VMMs runs as a user-level application in a different address space on top of the formally verified microkernel, wherein each of the plurality of VMMs support execution of a different guest operating system running in a different virtual machine (VM), wherein a particular VMM manages interactions between a corresponding VM and hardware resources of the computing device, and wherein the plurality of VMMs are formally verified;

for each of the plurality of VMMs, continuously monitoring at least a portion of the hardware resources of the computing device including performing virtual machine introspection (VMI) on at least the portion of the hardware resources of the computing device outside of the guest operating system running in the virtual machine corresponding to that VMM;

determining, from the continuously monitoring, a violation of a policy through one of the quest operating systems running in one of the VMs; and responsive to the determination of the violation of policy, taking one or more remedial steps, wherein taking the one or more remedial steps includes causing a virtual network policy enforcer to enforce a network policy at a virtual switch executing in the computing device that affects communication of that quest operating system, wherein the virtual network policy enforcer is formally verified.

10. The method of claim 9, wherein the virtual switch is coupled with the set of one or more virtual machine monitors and is not directly coupled with any VM.

11. The method of claim 9, wherein the policy is configured by an administrator of the computing device.

12. The method of claim 9, wherein the policy is received dynamically from a remote server.

13. A non-transitory machine-readable storage medium that provides instructions that, if executed by a processor of a computing device, will cause said processor to carry out the following operations:

executing a formally verified microkernel in a most privileged level to abstract hardware resources of the computing device, wherein the formally verified microkernel controls access to the hardware resources using explicit authorization;

executing a plurality of virtual machine monitors (VMMs), wherein each of the plurality of VMMs runs as a user-level application in a different address space on top of the formally verified microkernel, wherein each of the plurality of VMMs support execution of a different guest operating system running in a different virtual machine (VM), wherein a particular VMM manages interactions between a corresponding VM and hardware resources of the computing device, and wherein the plurality of VMMs are formally verified;

for each of the plurality of VMMs, continuously monitoring at least a portion of the hardware resources of the computing device including performing virtual machine introspection (VMI) on at least the portion of the hardware resources of the computing device outside of the guest operating system running in the virtual machine corresponding to that VMM;

determining, from the continuously monitoring, a violation of a policy through one of the quest operating systems running in one of the VMs; and responsive to the determination of the violation of policy, taking one or more remedial steps, wherein taking the one or more remedial steps includes causing a virtual network policy enforcer to enforce a network policy at a virtual switch executing in the computing device that affects communication of that quest operating system, wherein the virtual network policy enforcer is formally verified.

14. The non-transitory machine-readable storage medium of claim 13, wherein the virtual switch executing in the computing device is coupled with the set of one or more virtual machine monitors and is not directly coupled with any VM.

15. The non-transitory machine-readable storage medium of claim 13, wherein the policy is configured by an administrator of the computing device.

16. The non-transitory machine-readable storage medium of claim 13, wherein the policy is received dynamically from a remote server.

* * * * *